United States Patent
Minowa et al.

[11] Patent Number: 5,150,635
[45] Date of Patent: Sep. 29, 1992

[54] METHOD AND APPARTAUS FOR CONTROLLING DRIVING POWER OF MOTOR VEHICLE

[75] Inventors: Toshimichi Minowa, Ibaraki; Yoshishige Ohyama, Katsuta, both of Japan

[73] Assignee: Hitachi, Ltd., Tokyo, Japan

[21] Appl. No.: 686,527

[22] Filed: Apr. 17, 1991

[30] Foreign Application Priority Data

Apr. 18, 1990 [JP] Japan .................. 2-100321

[51] Int. Cl.⁵ .............................. B60K 41/04
[52] U.S. Cl. ........................ 74/866; 74/877
[58] Field of Search .......... 74/857, 858, 860, 877, 74/866

[56] References Cited
U.S. PATENT DOCUMENTS

| | | | |
|---|---|---|---|
| 4,226,141 | 10/1980 | Espenschied | 74/858 |
| 4,369,676 | 1/1983 | Gaus | 74/877 X |
| 4,370,904 | 2/1983 | Muller et al. | 74/858 |
| 4,422,353 | 12/1983 | Saga et al. | 74/858 |
| 4,459,879 | 7/1984 | Miki et al. | 74/866 X |
| 4,470,117 | 9/1984 | Miki et al. | 74/866 X |
| 4,493,228 | 1/1985 | Vakovich et al. | 74/858 |
| 4,543,855 | 10/1985 | Oetting et al. | 74/857 X |
| 4,651,595 | 3/1987 | Miyawaki | 74/877 X |
| 4,677,880 | 7/1987 | Hattori et al. | 74/858 X |
| 4,774,858 | 10/1988 | Ganoung | 74/859 |
| 4,843,551 | 6/1989 | Milunaus | 74/866 X |
| 4,933,851 | 6/1990 | Ito et al. | 74/858 X |
| 5,016,494 | 5/1991 | Yamaguchi | 74/857 X |

FOREIGN PATENT DOCUMENTS 1-4544 1/1989 Japan .

Primary Examiner—Rodney H. Bonck
Assistant Examiner—Ryan W. Massey
Attorney, Agent, or Firm—Antonelli, Terry, Stout & Kraus

[57] ABSTRACT

A driving power control apparatus for a motor vehicle. For meeting acceleration performance demanded by a driver of the motor vehicle, engine torque produced by an internal combustion engine and driving torque of the motor vehicle determined by the engine torque and a speed change ratio of a transmission are controlled coordinately for thereby allowing acceleration satisfying exactly the driver's demand.

35 Claims, 25 Drawing Sheets

F I G. 13
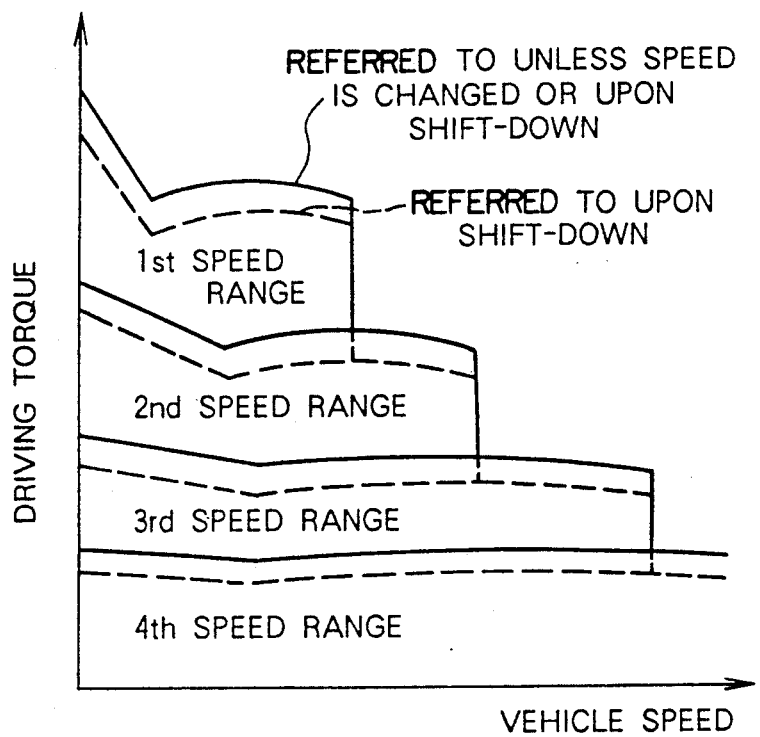
F I G. 14
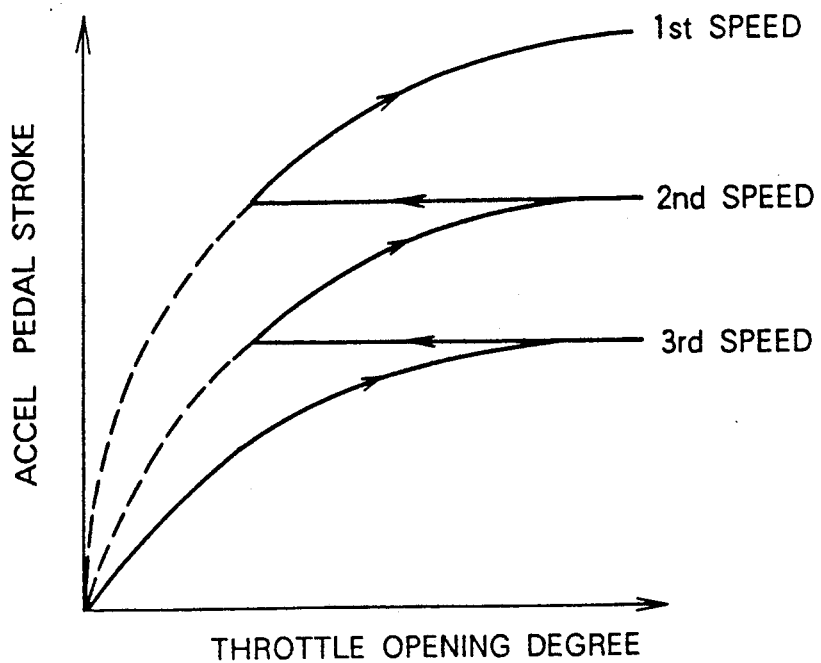

METHOD AND APPARTAUS FOR CONTROLLING DRIVING POWER OF MOTOR VEHICLE

BACKGROUND OF THE INVENTION

Field of the Invention

The present invention relates to a method of controlling a driving power of a motor vehicle and an apparatus for carrying out the method.

In general, the driving power of a motor vehicle can be controlled through combination of a transmission with an internal combustion engine.

In the case of the driving power control system known heretofore, however, a serious problem has arisen with regard to operation performance or maneuverability of the motor vehicle because the engine and the transmission are controlled separately independent of each other.

Under the circumstances, there has recently been proposed an attempt for improving the maneuverability of the motor vehicle by increasing or decreasing the output power or torque of the engine upon changing of the vehicle speed by shifting up or down correspondingly through the speed ranges of the transmission, as is disclosed in JP-A-64-4544.

However, the proposed system still suffers from a disadvantage that the actual operation of the motor vehicle can not satisfactorily follow the maneuverability demanded by the driver to such extent that he or she feels comfortable in the way the vehicle drive.

SUMMARY OF THE INVENTION

Accordingly, an object of the present invention is to provide a method of controlling driving power of a motor vehicle such that a driver can experience a feeling of congruence between the maneuverability of a motor vehicle demanded by the driver and the actual operation of the vehicle sufficient to realize enhanced comfortableness of driving. It is another object of the invention to provide an apparatus for carrying out the method.

In view of the above and other objects which will be apparent as this description proceeds, there is proposed according to an aspect of the invention an apparatus for controlling the driving power of a motor vehicle, which apparatus comprises engine torque control means for controlling engine torque outputted from an internal combustion engine of the motor vehicle, driving torque control means for controlling a driving torque for driving the motor vehicle on the basis of combinations of the engine torques and transmission gear ratios of a transmission, and torque control means for causing at least one of the engine torque control means and the driving torque control means to perform torque control in response to a desired torque demanded by a driver on the basis of the engine torque or the driving torque or the combination of the engine torque and the driving torque.

With the structure of the driving power control apparatus for the motor vehicle described above, a feeling of comfort in driving the motor vehicle can be enhanced because of the capability of controlling the engine torque and/or driving torque so as to follow the torque characteristics demanded by the driver.

BRIEF DESCRIPTION OF THE DRAWINGS

FIG. 13 is a characteristic diagram for illustrating relations existing among vehicle speeds, driving torques and speed ranges of a transmission;

FIG. 14 is a view for illustrating graphically another example of a control scheme according to the invention;

DESCRIPTION OF THE PREFERRED EMBODIMENTS

Now, the present invention will be described in detail in conjunction with exemplary or preferred embodiments thereof by reference to the accompanying drawings.

Figure 1:
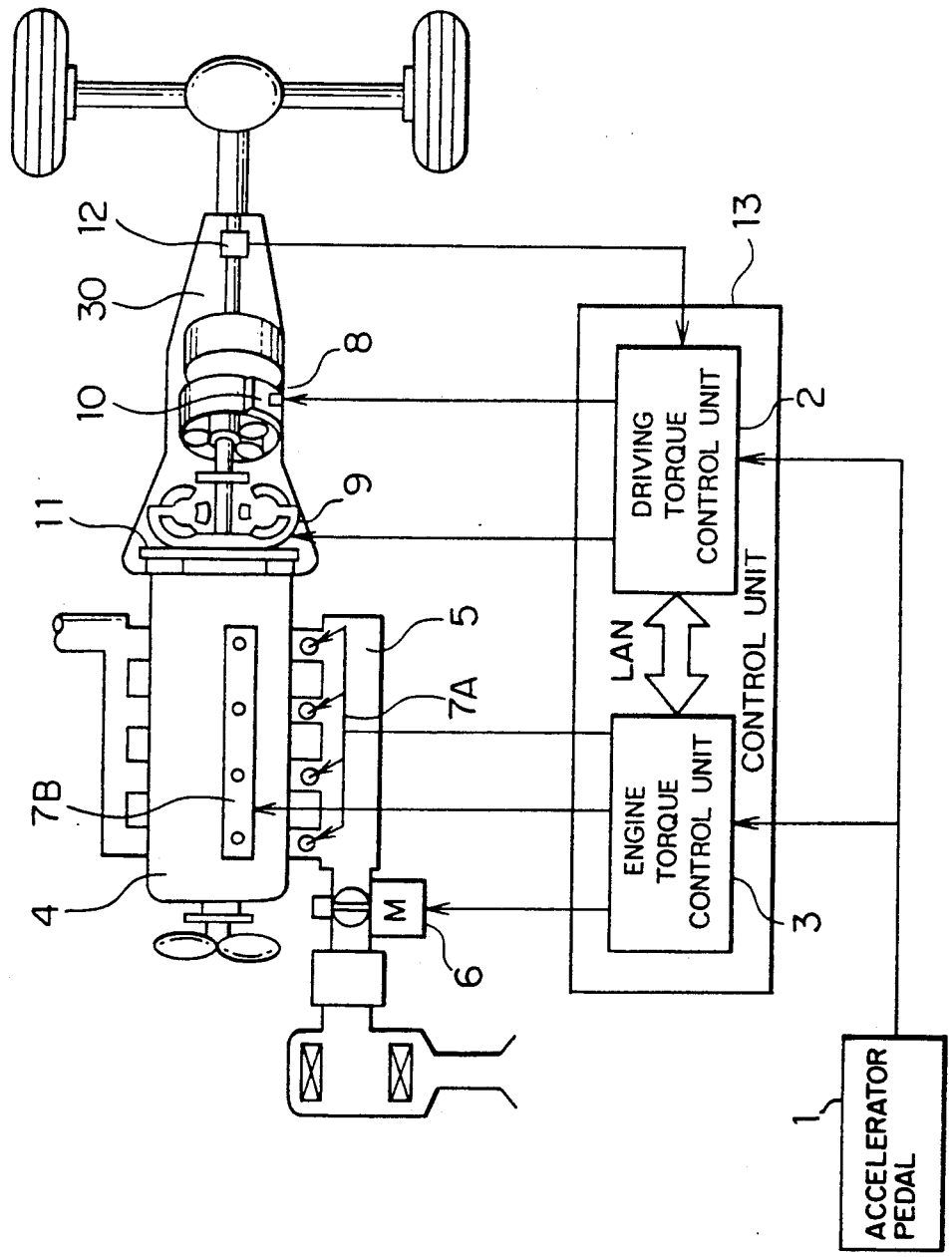
FIG. 1 is a diagram showing schematically the general arrangement of an apparatus for controlling a driving power of a motor vehicle according to an embodiment of the invention together with a power transmission train of the vehicle.

FIG. 1 is a schematic diagram showing a driving torque control apparatus according to an embodiment of the invention together with a power transmission train thereof. Referring to the figure, a signal indicating magnitude of depression or actuation, i.e. a depression angle, of an accelerator pedal 1 (hereinafter also referred to as the accelerator pedal stroke) is inputted to a driving torque control unit 2 and/or an engine torque control unit 3. Controlled by the engine torque control unit 3 are a throttle control unit 6 (constituted by an electric motor, a throttle valve and a throttle sensor) which is installed in an intake pipe 5 leading to an internal combustion engine (hereinafter referred to as the engine) 4, a fuel injection system 7A and an ignition system 7B, whereby the engine output torque is controlled. On the other hand, the driving torque control unit 2 is adapted to operate or drive through a proportional or duty control an automatic transmission 30, a shift solenoid 8, a lock-up solenoid 9 and others, and additionally serve for connection and disconnection of a speed changing clutch 10 and a lock-up clutch 11, whereby a speed change control is performed. Through combination of the speed change control with the engine torque control in this manner, an intended driving torque control is realized.

The driving torque control based on the combination of the speed change control and the engine torque control (preferably the engine torque control based on the control of a degree of opening of the throttle valve) is performed on the basis of the speed of the motor vehicle indicated by a signal produced by a rotation sensor 12 installed in association with a drive shaft and the accelerator pedal stroke (i.e. magnitude of depression of the pedal). In the case of the illustrative embodiment, the engine torque control unit 3 and the driving torque control unit 2 are electrically interconnected for mutual communication through a local area network (LAN). Of course, when a high-performance computer such as 32-bit computer is employed, desired coordinated controls of the engine and the transmission train may be performed by a single integral control unit, as indicated generally by a block 13 in FIG. 1.

Figure 2:
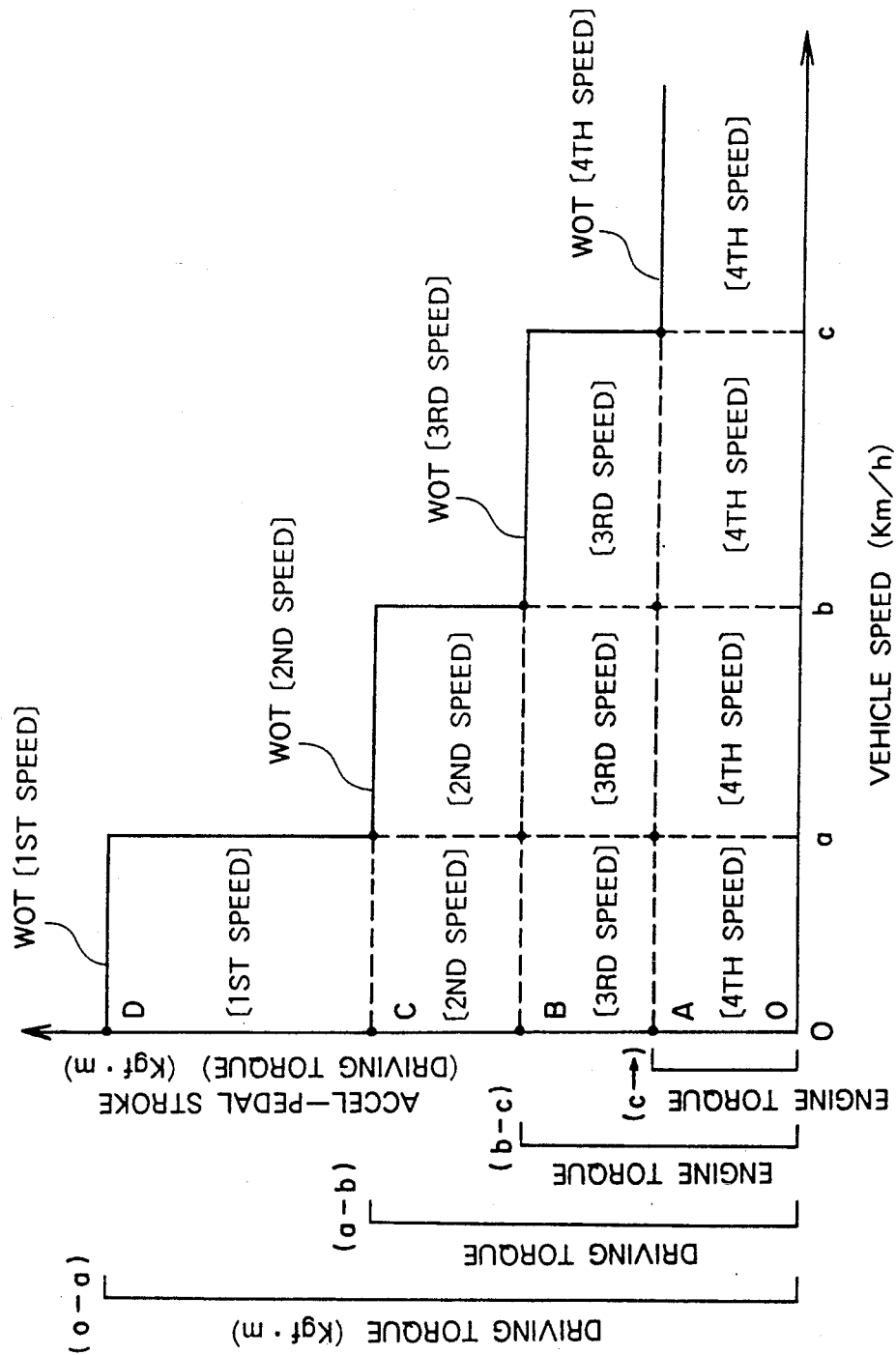
FIG. 2 is a view for graphically illustrating the basic concept underlying a driving torque control apparatus according to an embodiment of the invention.

FIG. 2 is a view for graphically illustrating the basic concept underlying the driving torque control according to an embodiment of the invention. In the figure, the speed of the motor vehicle is taken along the abscissa while the accelerator pedal stroke and hence the driving torque are taken along the ordinate. In FIG. 2, solid lines represent the driving torques in the state in which the throttle valve is fully opened, wherein an interval [0–a] represents a first speed range, an interval [a–b] represents a second speed range, an interval [b–c] represents a third speed range and a following interval [c→] represents a fourth speed range on the assumption that the torques to be controlled by the actuation of the accelerator pedal are classified into the driving torques in the vehicle speed intervals [0–a] and [a–b], respectively, and the engine torques in the vehicle speed intervals [b–c] and [c→], respectively, as shown along the ordinate. Accordingly, when a driver has depressed the accelerator pedal to a value B (pedal stroke B) in the speed interval [0–a], the transmission gear ratio is set to the third speed range with the throttle valve being fully opened, because the desired driving torque corresponding to the accelerator pedal stroke is the torque B. On the other hand, when the vehicle speed is higher than b, there is no longer available a driving torque having values C to D even when the accelerator pedal is depressed to a maximum. Accordingly, the desired or demand torque corresponding to the depression of the accelerator pedal will have to be provided as an engine torque. So far as the vehicle speed lies within the interval [0–b], it is required to perform a control on the basis of a combination of the driving torque and the engine torque.

Figure 3:
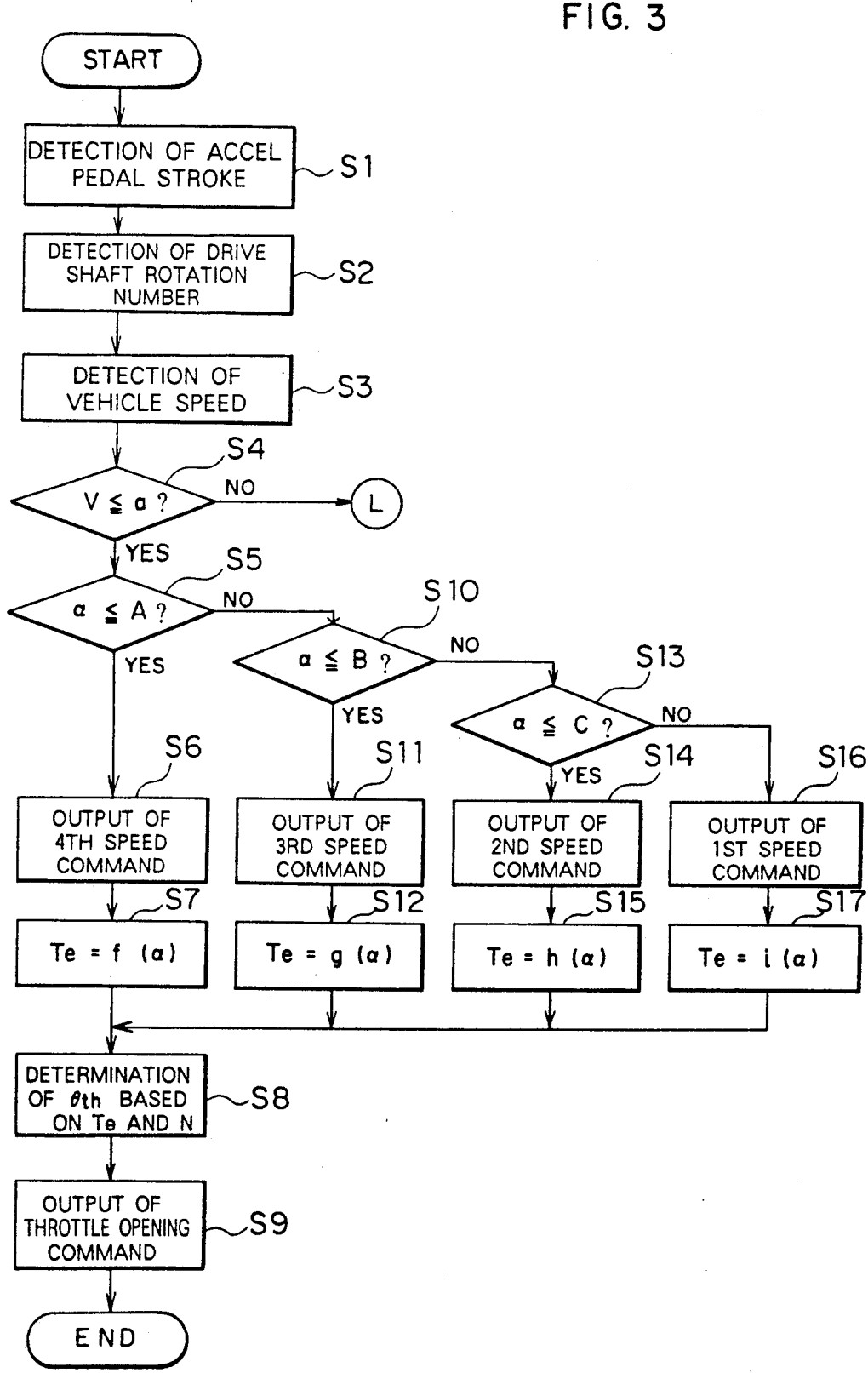
FIGS. 3 to 5 are flow charts for illustrating a control procedure to be executed on the basis of the control scheme shown in FIG. 2.
Figure 4:
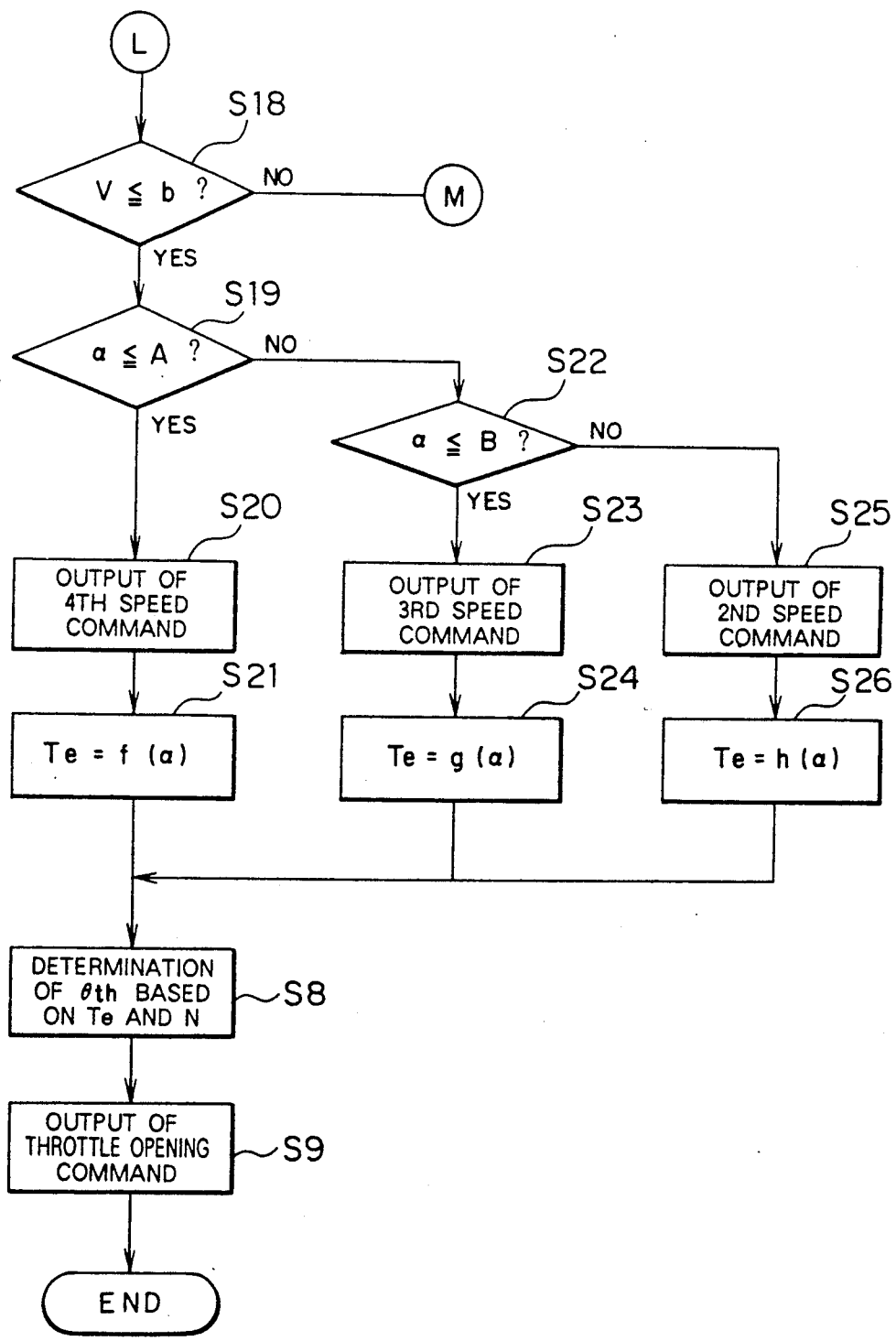
Figure 5:
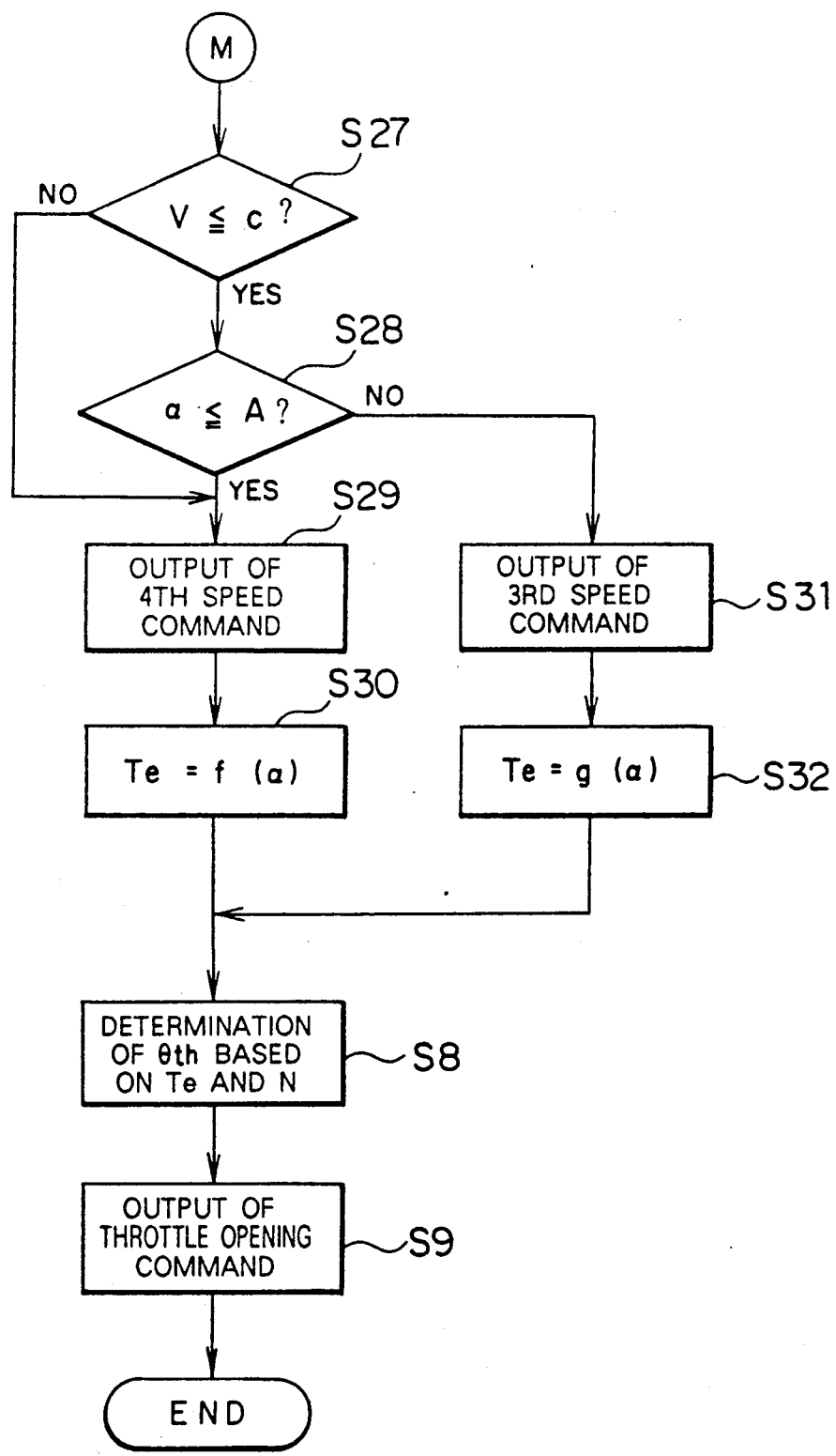
Figure 6:
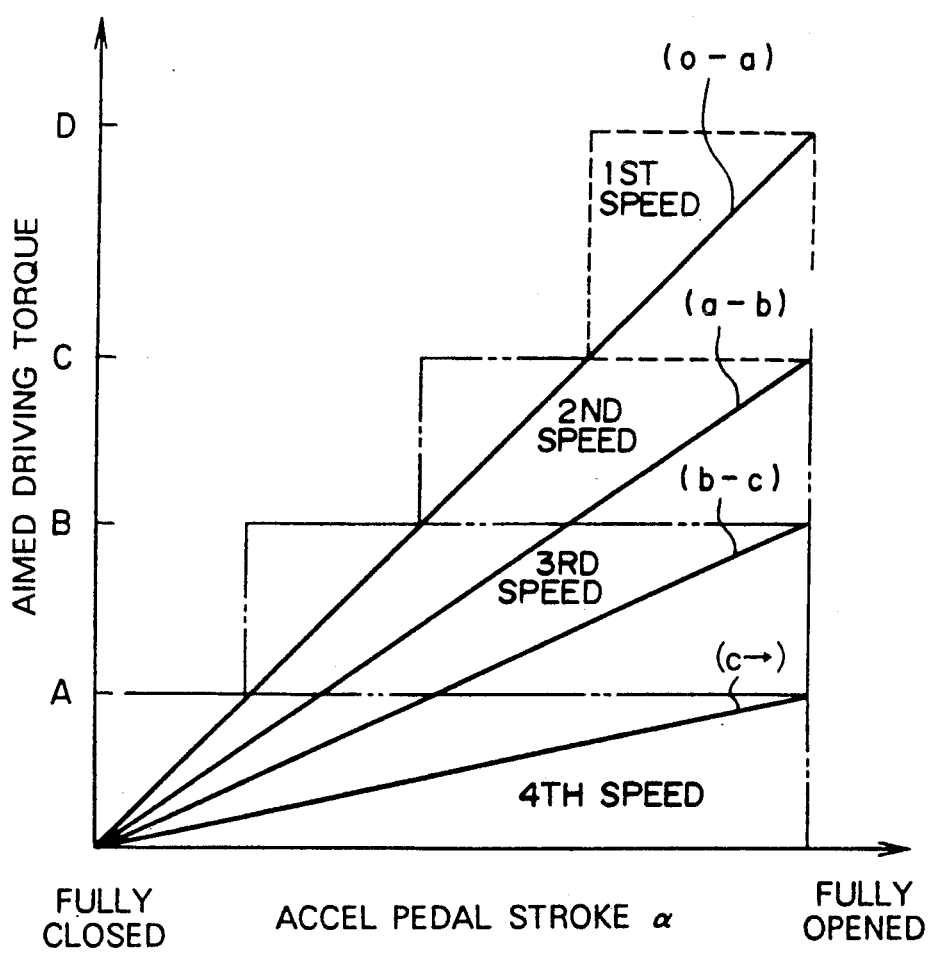
FIG. 6 is a view showing graphically relations existing between driving torques and accelerator pedal strokes with speed ranges changed over by a transmission being used as a parameter.
Figure 7:
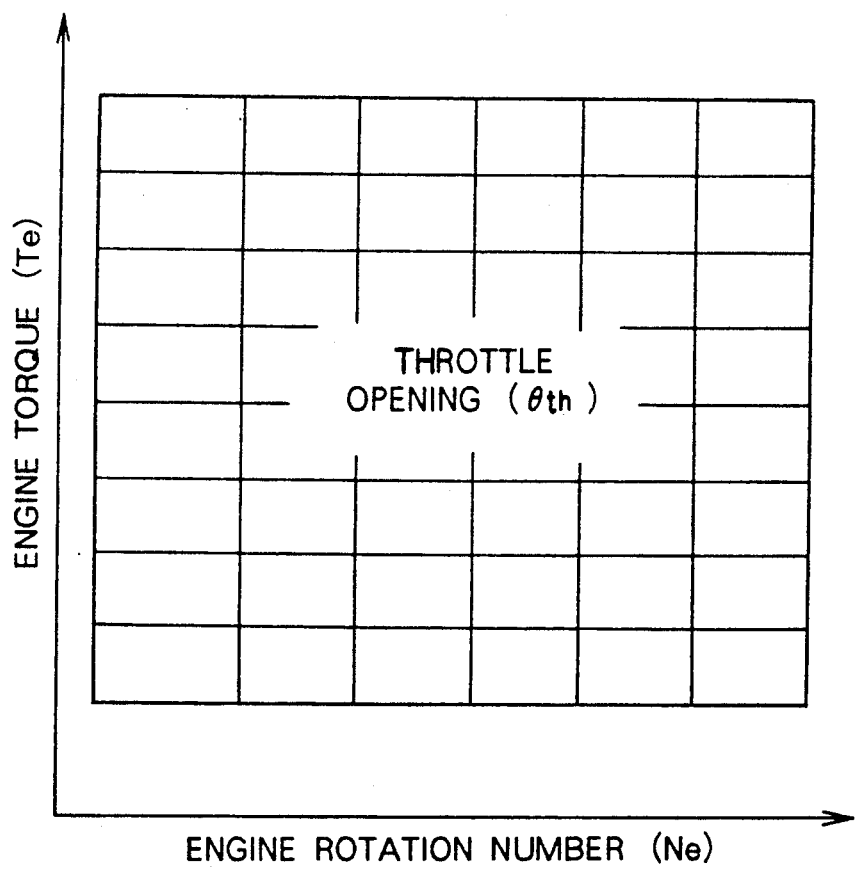
FIG. 7 is a view showing a map of throttle opening degrees in correlation with engine rotation numbers and engine torques.

FIGS. 3 to 5 are flow charts for illustrating execution of the control scheme described above. Referring to the figures, the accelerator pedal stroke $\alpha$ which indicates the torque demanded by the driver is fetched at a step S1, being followed by a step S2 where the engine rotation number $N_e$ is detected and a step S3 where the vehicle speed V is detected, respectively. At a step S4, it is decided whether the vehicle speed V is equal to or lower than the speed a shown in FIG. 2. When the result of this decision is affirmative (Yes), i.e. when V is equal to a or falls within the interval [0–a], a decision is then made at a step S5 whether the accelerator pedal stroke $\alpha$ is smaller than the value A (FIG. 2), inclusive thereof. If so (Yes), a signal is outputted which commands that the transmission gear ratio (converter drive position) be set to the fourth speed range. The desired or target value of the driving torque corresponding to the accelerator pedal stroke $\alpha$ at that time can be determined by consulating a driving torque vis-à-vis accelerator pedal stroke map shown in FIG. 6. At a step S7, the engine torque $T_e$ is determined on the basis of the accelerator pedal stroke $\alpha$ in accordance with a function $f(\alpha)$ prepared by taking into account a reduction gear ratio and other factors. At a step S8, the opening degree $\theta_{th}$ of the throttle valve is determined on the basis of the engine torque $T_e$ thus determined and the engine rotation number $N_e$ by consulting a map of throttle opening degrees ($\theta_{th}$) shown in FIG. 7, whereon a signal indicating the throttle opening degree thus determined is outputted to the throttle control unit 6 at a step S9 to thereby allow the driving torque demanded by the driver to be outputted.

On the other hand, when it is determined at the step S5 that the accelerator pedal stroke $\alpha$ is greater than A, a decision is then made at a step S10 as to whether or not the accelerator pedal stroke $\alpha$ is equal to or smaller than the value B (FIG. 2). If so, the third speed range command is issued at a step S11, being followed by a step S12 where the engine torque $T_e$ is determined through similar procedure as that of the step S7 described above, whereon the control processing proceeds to the step S8.

When the decision at the step S10 results in that the accelerator pedal stoke $\alpha$ is greater than B, it is then decided at a step S13 whether $\alpha$ is equal to or smaller than C. If so, a second speed range command is outputted at a step S14, which is then followed by a step S15 at which the engine torque $T_e$ is determined similarly to the step S7, whereon the control processing proceeds to the step S8.

On the other hand, when the decision at the step S13 shows that the accelerator pedal stroke α is greater than C, a first speed range command is issued at a step S16, which is then followed by a step S17 for determining the engine torque $T_e$, whereon the processing proceeds to the step S8, as described above.

In the foregoing, it has been assumed that the accelerator pedal stroke α is changed in the state where the vehicle speed is within the interval [0–a].

In contrast, when it is determined at the abovementioned step S4 that the vehicle speed is higher than a, the control procedure branches to a processing flow shown in FIG. 4, as indicated by Ⓛ.

Now, referring to FIG. 4, decision is made at a step S18 as to whether the vehicle speed V is equal to or lower than b.

When it is determined from the decisions at the steps S4 and S18 that the vehicle speed falls within the interval [a–b], decisions are then made as to whether the accelerator pedal stroke α exceeds the values A and B at steps S19 and S22, respectively.

Subsequently, at succeeding steps S20; S21 to S25; S26, processings similar to those at the steps S6 to S17 are executed, being followed by the steps S8 and S9, as described above by reference to FIG. 3.

At this juncture, it is to be noted that the first speed range is not selected within the vehicle speed interval [a–b].

When decision is made at the step S18 in FIG. 4 that the vehicle speed V is higher than b, the control procedure then branches to a processing flow illustrated in FIG. 5, as indicated by Ⓜ, whereon it is decided at a step S27 whether the vehicle speed is lower than c inclusive.

When it is determined that the vehicle speed falls within the interval [b–c], then decision is made at a step S28 whether the accelerator pedal stroke α is smaller than A inclusive, which is then followed by processing steps S29 to S32 as well as the steps S8 and S9, whereby the similar processing described hereinbefore in conjunction with FIG. 3 is executed.

In this vehicle speed interval [b–c], neither the first nor the second speed range is selected.

Finally, when it is determined at a step S27 that the vehicle speed is higher than c, the processing jumps directly to the step S29 at which the fourth speed command is issued, whereon the throttle opening degree $\theta_{th}$ is determined.

Figure 8:
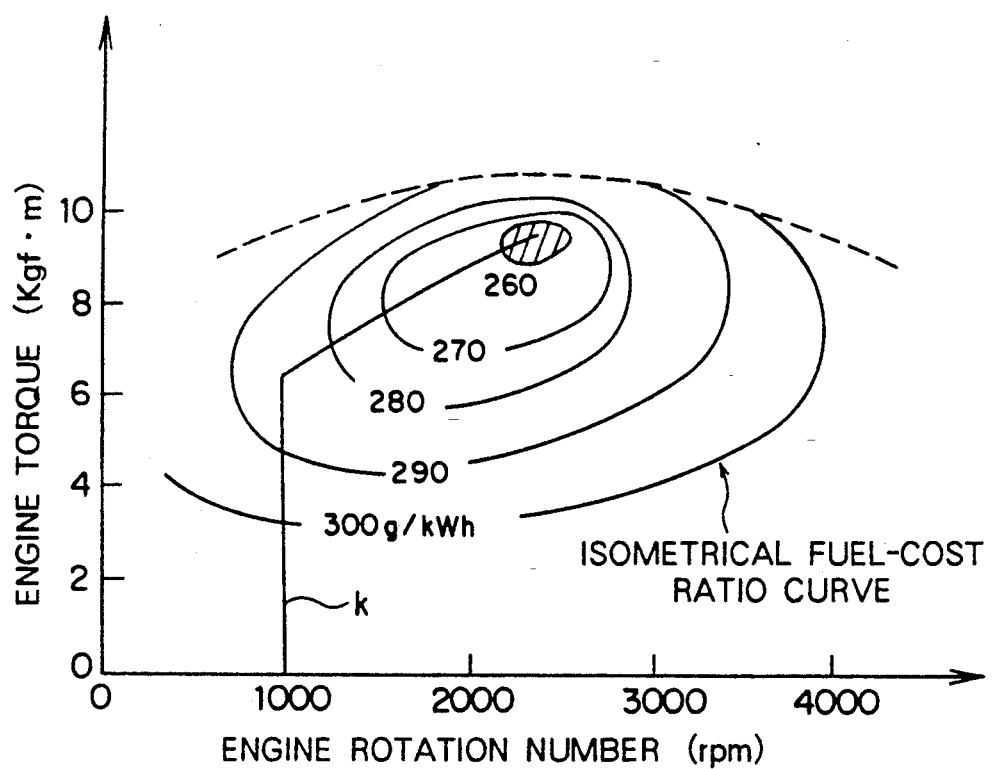
FIG. 8 is a view for graphically illustrating fuel-cost characteristics as a function of engine rotation or revolution number and engine torque.

FIG. 8 is a view for graphically illustrating isometrical fuel-cost characteristics as a function of the engine rotation numbers and torques. In this figure, the engine rotation number per unit time (engine speed) is taken along the abscissa with the engine torque being taken along the ordinate. In the figure, a broken line curve represents the engine torque produced when the throttle valve is fully opened. Further, in this figure, a hatched area represents a region in which the fuel-cost ratio is most preferable. Besides, a solid line curve k represents a path of transition to the hatched area along which the most preferable fuel-cost ratio can be assured. As can be seen from this curve k, in order to realize the most preferable fuel-cost characteristic, it is required to increase the engine torque up to a point corresponding to about two thirds of the maximum torque of the hatched area while maintaining the engine rotation number at 1000 rpm, wherein upon the engine torque reaching the abovementioned point, the engine rotation number and the engine torque are both increased coordinately to the respective maximum values corresponding to the hatched area. By controlling the driving torque in this manner, economization of fuel can be improved significantly because of the operation which can follow the most preferable fuel-cost characteristic curve k.

Figure 9:
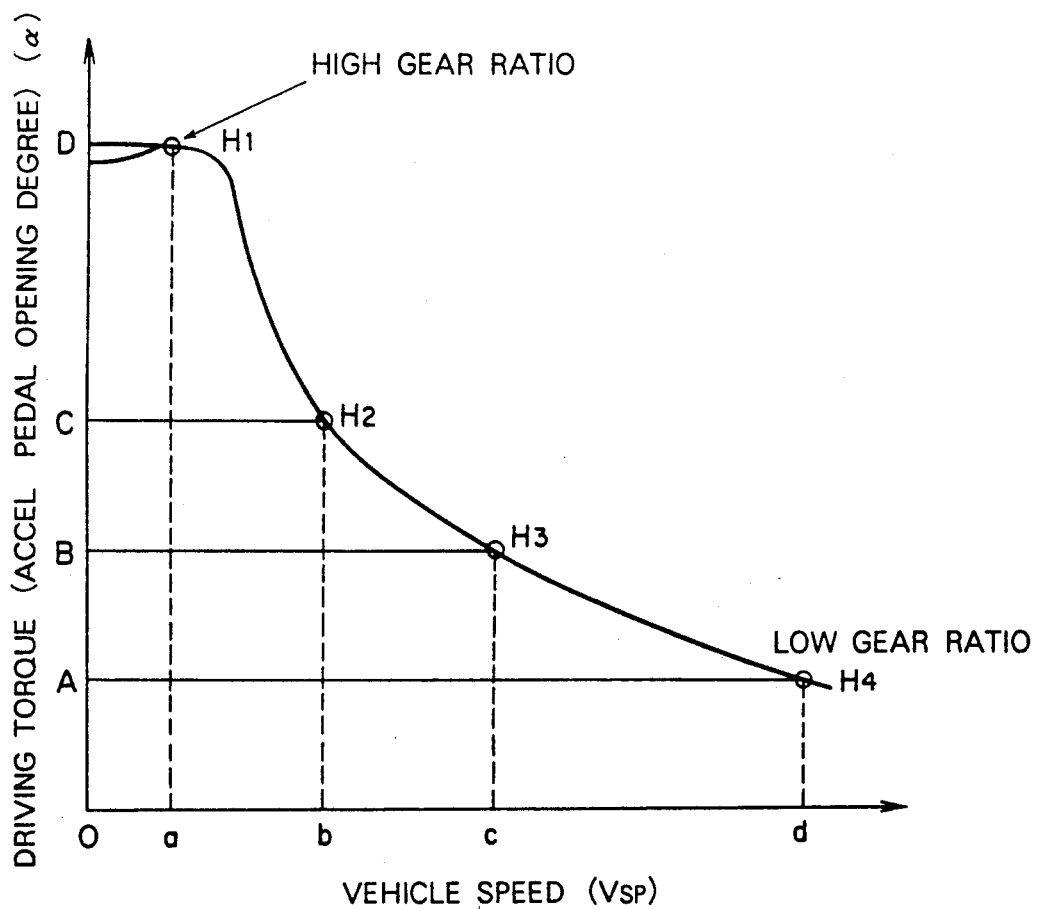
FIG. 9 is a view for graphically illustrating the principle of a control apparatus according to the invention for a motor vehicle in which a stepless transmission (torque converter) is employed.

FIG. 9 is a view for graphically illustrating a relation between the vehicle speed and the driving torque in a motor vehicle in which a stepless transmission (also known as torque converter or CVT for short) is employed. As can be seen from the figure, the transmission gear ratio can be changed freely in the case of the stepless transmission. Accordingly, there is no appearance of a stepwise change in the driving torque (i.e. the latter can be varied continuously or smoothly).

The maximum value of the driving torque which changes as a function of the vehicle speed is set to a value to correspond to the maximum accelerator pedal stroke. A curve shown in FIG. 9 represents the target or demanded driving torque at given vehicle speeds.

More specifically, when the motor vehicle is running at a speed a, the driving torque D represents the maximum value of the driving torque demanded by the driver who has pushed down or floored the accelerator pedal to a maximum. The angle of the accelerator pedal relative to the floor is represented by C at that time. When the transmission gear ratio is changed over from $H_1$ to $H_2$ in this state, the driving torque can be changed in the state where the throttle valve is opened fully.

When the accelerator pedal stroke is A at the vehicle speed b, the transmission gear ratio is set to $H_4$ with the throttle valve being opened fully.

Figure 10:
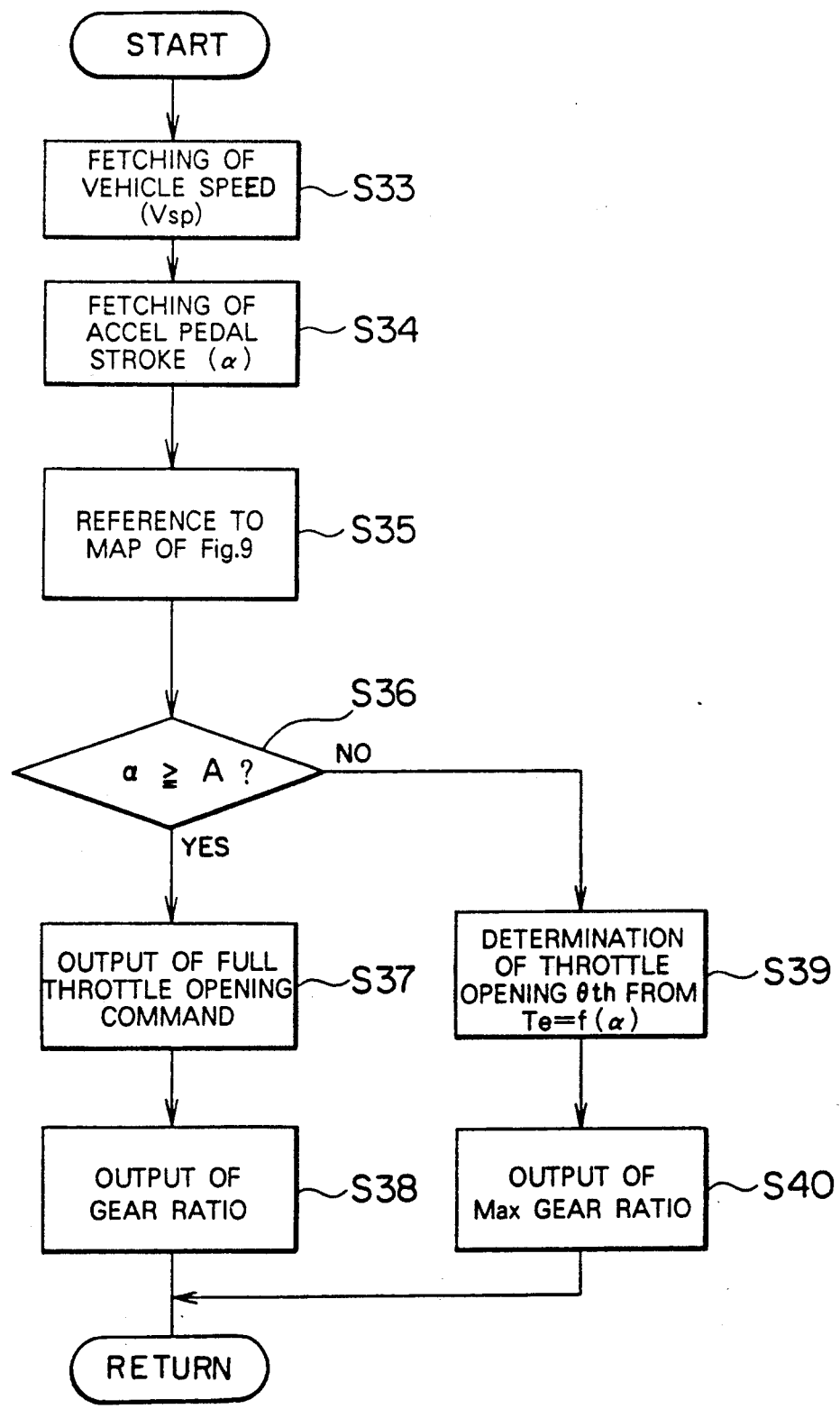
FIG. 10 is a flow chart for illustrating a procedure for realizing the control scheme shown in FIG. 9.

FIG. 10 is a flow chart for illustrating a control procedure for the motor vehicle in which the stepless transmission or torque converter is employed. Referring to the figure, the vehicle speed $V_{SP}$ and the accelerator pedal stroke (α) are detected at steps S33 and S34, respectively. Therefore, a map of the relations between the vehicle speeds and the accelerator pedal strokes (desired driving torques) such as shown in FIG. 9 is retrieved at a step S38. Subsequently, at a step 36, it is decided whether the driving torque indicated by the detected accelerator pedal stroke α is equal to or greater than the driving torque at the upper limit transmission gear ratio $H_4$ (i.e. the demanded driving torque A). If so, the throttle opening degree $\theta_{th}$ is set to a maximum value at a step S37, whereon the transmission gear ratio compatible with the vehicle speed and the accelerator pedal stroke is selected at a step S38 that α<A, and the throttle opening degree $\theta_{th}$ is determined on the basis of the engine torque $T_e = f(\alpha)$. The transmission gear ratio is set to the upper limit $H_4$.

In this manner, according to the teaching of the invention as employed in the embodiment described above, there can be realized the feeling of congruence between the maneuverability demanded by the driver and the actual operation performance of the motor vehicle.

Next, description will be made of a modified embodiment of the invention.

Figure 11B:
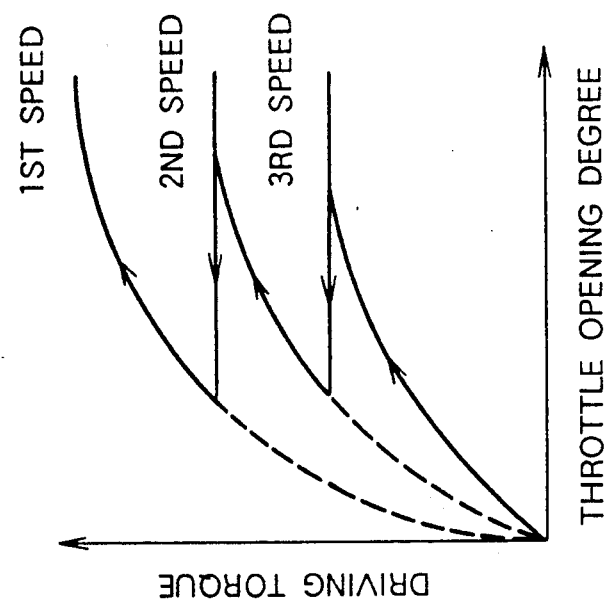
FIG. 11B is a characteristic diagram for graphically illustrating another driving torque control scheme according to the invention in comparison with a corresponding control known heretofore and shown in FIG. 11A.
Figure 11A:
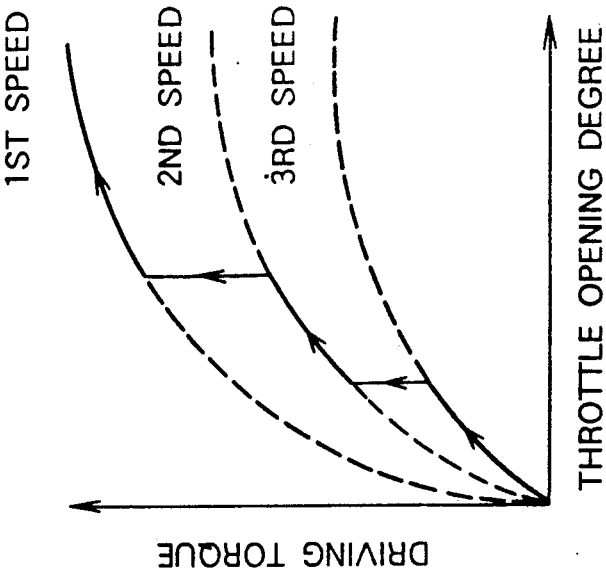
FIG. 11A is a characteristic diagram for graphically illustrating a conventional driving torque control scheme.

FIGS. 11A and 11B are views for graphically illustrating relations between the driving torque and the throttle opening degree in torque control systems according to the prior art and the invention, respectively. Referring to the figures, it will be seen that the relation between the throttle opening degree and the driving torque becomes different in dependence on the speed ranges, as indicated by broken line curves. According to the control scheme known heretofore, as the driving torque is progressively increased by pushing down gradually the accelerator pedal, the speed ranges of the transmission are shifted down from one to another. In contrast, the control system according to the instant embodiment of the invention is designed to operate such that even when the driving torque is increased, the current speed range of the transmission is maintained until the throttle valve is fully opened, whereon the speed range is shifted down only when a higher driving torque is demanded, as is shown in FIG. 11B. At this time, however, the throttle valve is once closed and subsequently opened again when the driving torque is further increased, which is then followed by the shift-down of the speed range. This process is repeated. With this control scheme, the driving torque is protected against changing rapidly or abruptly. This control scheme is very advantageous from the standpoint of the fuel cost ratio because the fully opened throttle range is made use of predominantly in combination with the high speed range, whereby the engine rotation number can be maintained low, as described hereinbefore in conjunction with FIG. 8. Further, because the opening degree of the throttle valve is so controlled upon speed change that the torque is prevented from changing rapidly or abruptly, shock due to the speed change can be mitigated.

Figure 12:
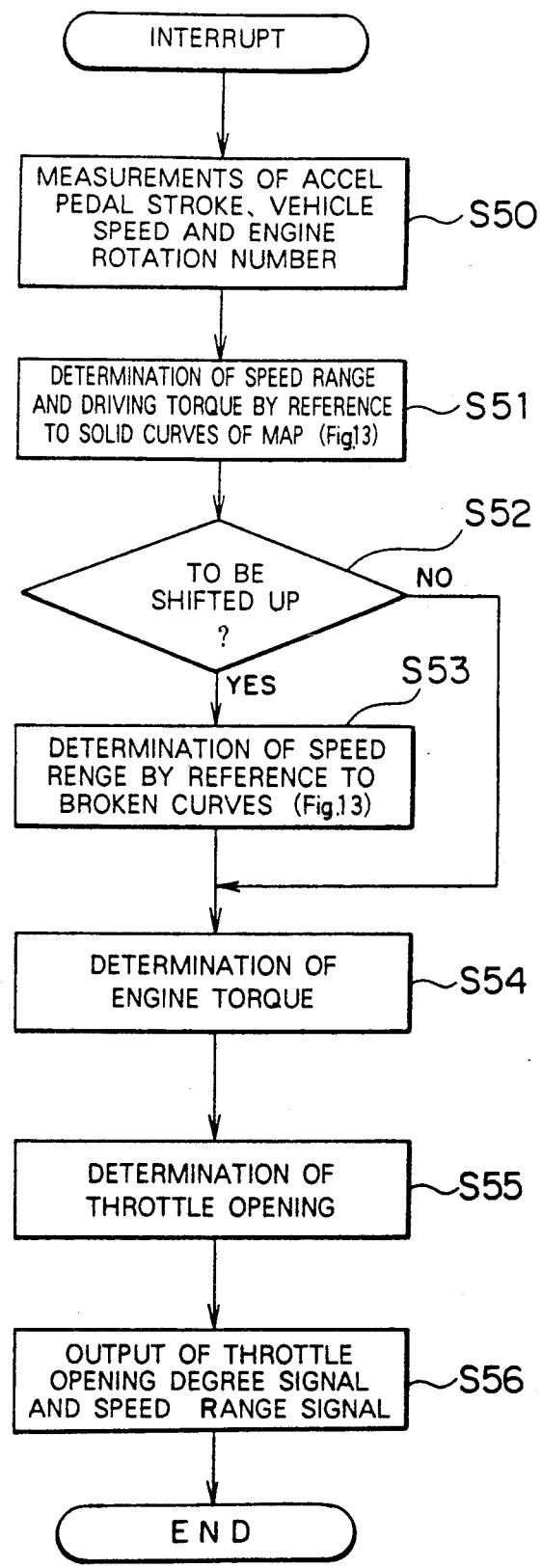
FIG. 12 is a flow chart for illustrating a control procedure for realizing the control scheme shown in FIG. 11B.

FIG. 12 is a flow chart for illustrating operation of a control system based on the control concept illustrated in FIG. 11B. Referring to FIG. 12, in response to the input of a timer interrupt signal, the accelerator speed and the vehicle speed are first measured at a step S50. Subsequently, at a step S51, the driving torque and the speed range for the transmission are calculated on the basis of relations shown in FIG. 13 which shows graphically the relations existing among the vehicle speeds, the driving torques and the speed ranges of the transmission, wherein the maximum driving torques at given vehicle speeds are indicated by solid line curves. The driving torque is calculated on the basis of the maximum driving torque corresponding to the current vehicle speed and the accelerator pedal stroke to thereby determine the speed range of the transmission. At this juncture, it should be mentioned that because the throttle valve is actuated frequently to the fully or approximately fully opened state, the speed ranges of the transmission may be changed over many times due to noise accompanying the voltage signal indicating the accelerator pedal stroke, giving rise to occurrence of a chattering phenomenon which must of course be prevented. To this end, the speed range of the transmission may be determined for the shift-up on the basis of the broken line curves shown in FIG. 13 at steps S52 and S53. By providing previously such hysteresis as illustrated in FIG. 13, the chattering phenomenon which would otherwise occur upon speed changing can positively be suppressed, whereby the transmission can be protected against abrasion or wear. Next, at a step S54, the engine torque is arithmetically determined on the basis of a product of the driving torque and the transmission gear ratio. Subsequently, at a step S56, a map prepared previously at a step S55 for the relations of the throttle opening degrees to the engine rotation numbers and the engine torques is consulated to determine the throttle opening degree, as a result of which signals indicative of the throttle opening degree and the speed range are outputted for controlling the engine output torque and the transmission gear ratio, respectively.

FIG. 14 is a view similar to FIG. 11B and illustrates graphically the concept of another control scheme for controlling the speed change and the throttle valve operation. According to this control scheme, the transmission (speed range) and the throttle opening degree are controlled on the basis of the accelerator pedal stroke without taking into consideration the vehicle speed.

Figure 15:
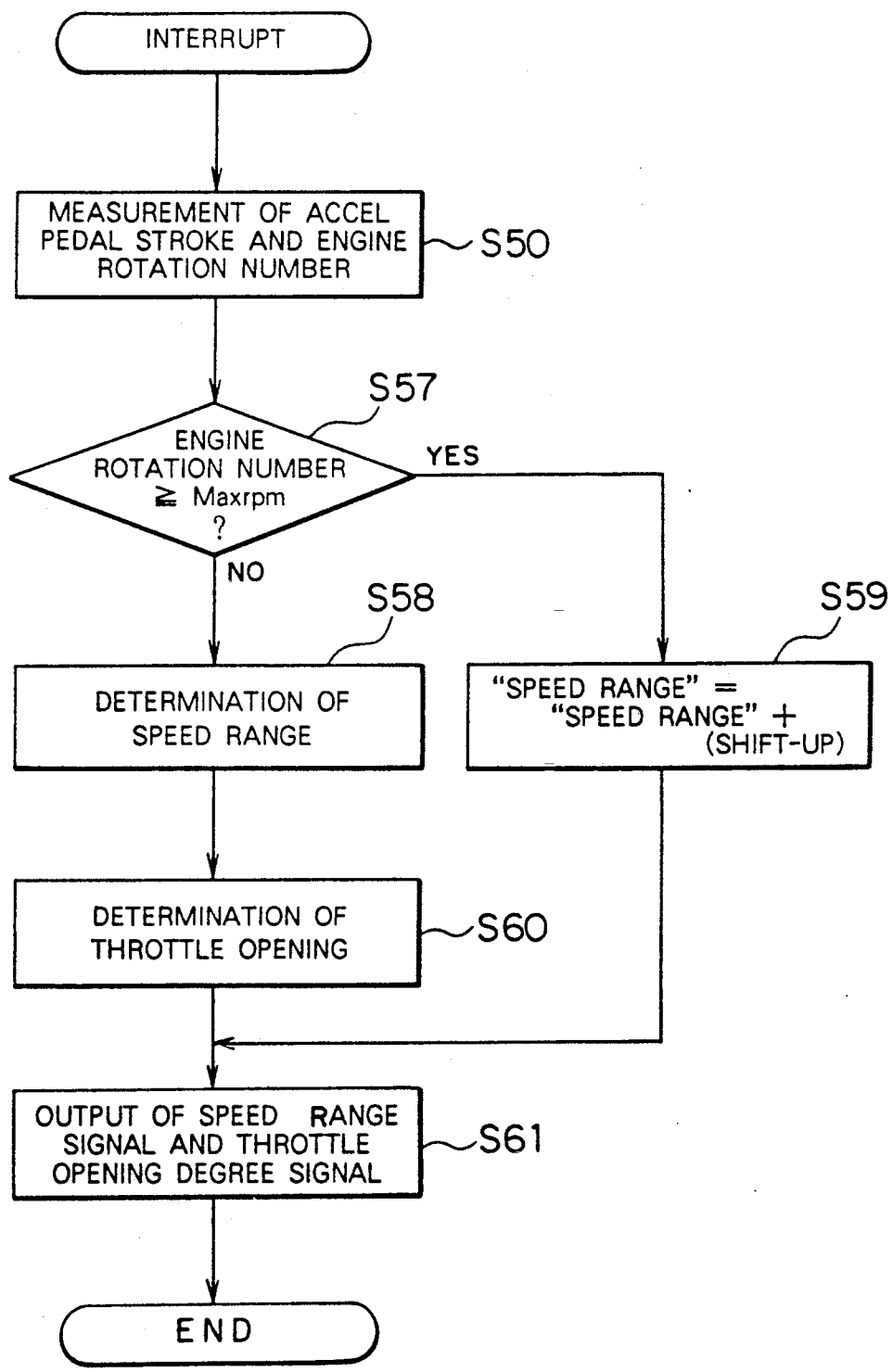
FIG. 15 is a flow chart for illustrating a procedure for executing the control shown in FIG. 14.

FIG. 15 shows a flow chart for illustrating the control scheme. At a step S50, the accelerator pedal stroke and the engine rotation number are measured, which is then followed by a step S57 where it is decided whether or not the maximum engine rotation number Maxrpm is exceeded. When the result of the step S57 is affirmative (Yes), the speed range is shifted up by one step for protecting the engine against abrasion at a step S59. If otherwise (No), the speed range and the throttle opening degree are determined on the basis of the relations illustrated in FIG. 14. Subsequently, at a step S61, the signals indicating the speed range and the throttle opening degree thus determined are outputted for controlling the transmission gear ratio and the engine output torque. This control scheme is much simplified as compared with the scheme shown in FIG. 12 and is advantageous over the latter in that the time taken for the arithmetic determination can be significantly shortened.

Figure 16:
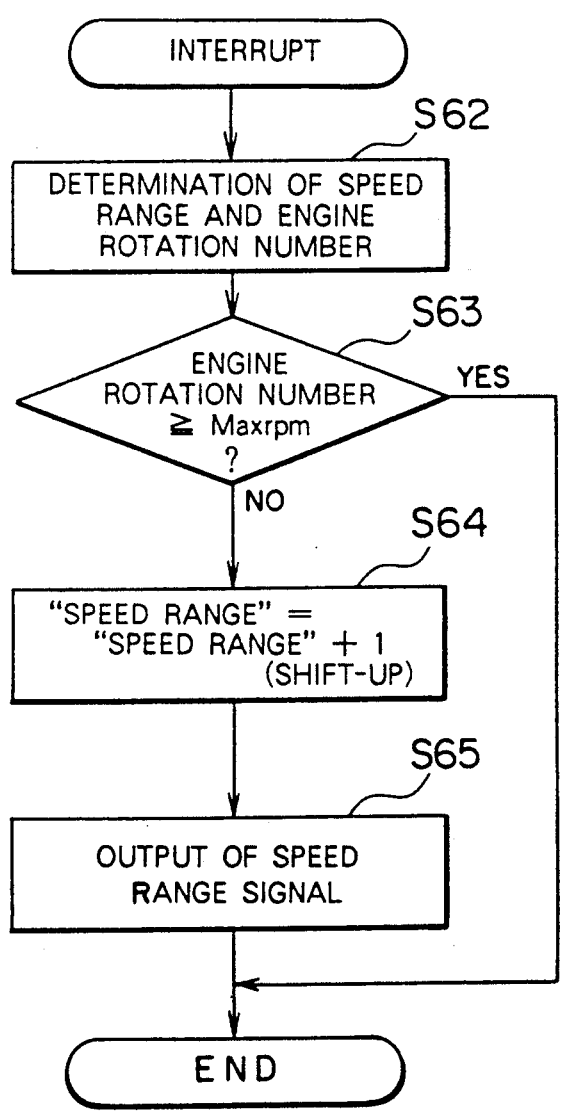
FIG. 16 is a flow chart for illustrating a control procedure to be executed additionally upon occurrence of an abnormality in the course of execution of the control procedure shown in FIG. 12.

FIG. 16 is a flow chart for illustrating a procedure of processing to be executed in case the engine rotation number becomes excessively large due to abnormality of operation of the throttle valve and the transmission occurring in the course of the control performed in accordance with the scheme shown in FIG. 12. To this end, a timer interrupt is issued for measuring the current transmission gear ratio and engine rotation number at a step S62. When it is decided at a step S63 that the engine rotation number exceeds a maximum engine rotation number Maxrpm, the speed range is shifted up through processing steps S64 and S65 to decrease the engine rotation number for thereby protecting the engine from wear or abrasion. At that time, the abnormality may be messaged to the driver by lighting an alarm lamp.

Now, description will be turned to exemplary applications of the teachings of the present invention.

Figure 17:
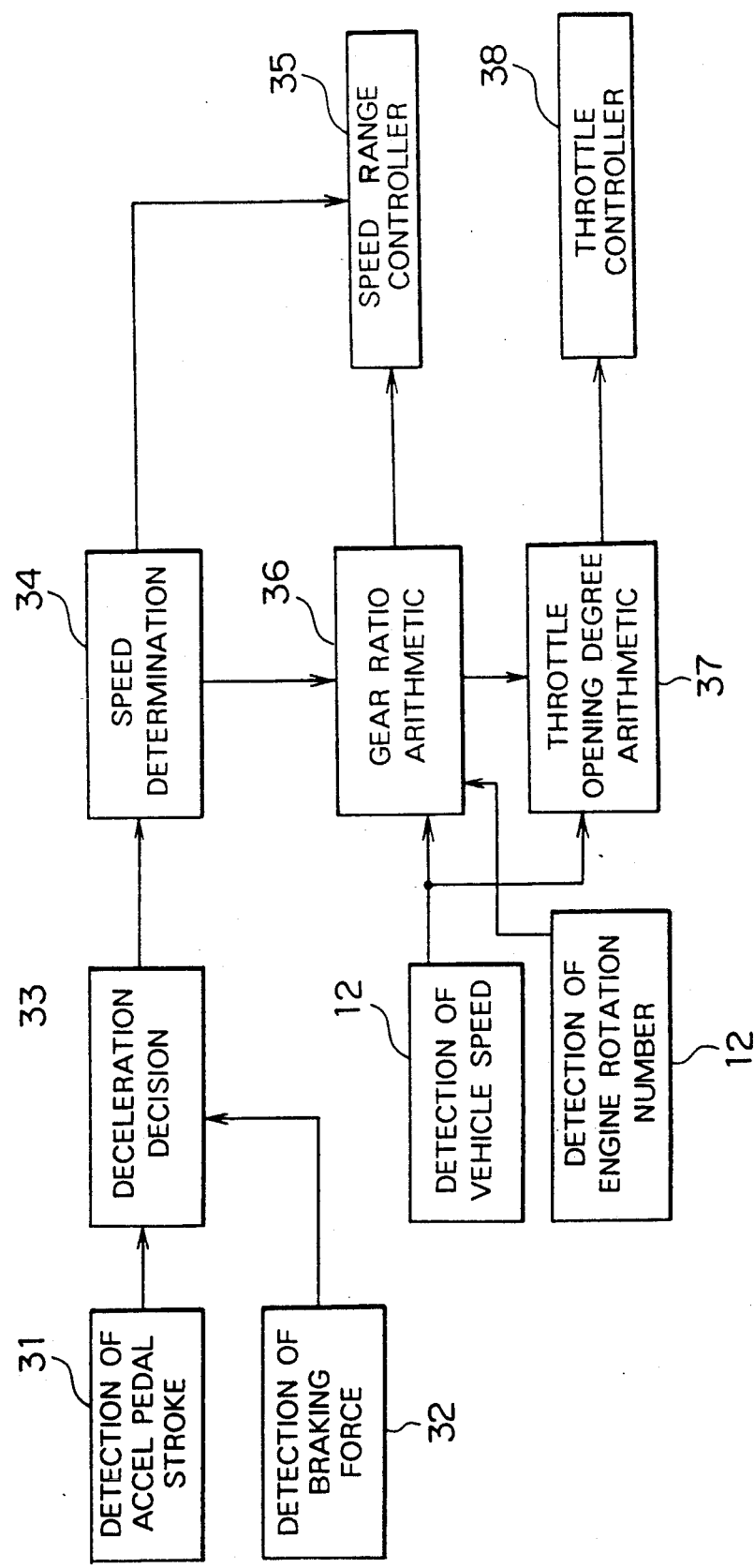
FIG. 17 is a functional block diagram showing a control system according to yet another embodiment of the invention.

FIG. 17 is a functional block diagram showing a deceleration control system. A reference numeral 33 denotes a deceleration decision function for making decision whether or not a driver desires deceleration of a motor vehicle on the basis of outputs from an accelerator pedal stroke detecting block 31 and a braking force detection block 32. Subsequently, a level of deceleration demanded by the driver is determined by a deceleration determining block 34. In case the level of deceleration demanded by the driver corresponds to a minimum or lowest speed, a signal indicating a speed range which can assure the highest fuel cost efficiency such as a neutral position N is outputted to a speed change controller 35. When the deceleration demanded by the driver exceeds a certain level, a speed change ratio arithmetic unit 36 outputs a speed changing ratio signal corresponding to the demanded deceleration to the speed change controller 35. Further, such a throttle opening degree which can prevent occurrence of shock upon speed change is determined by a throttle opening degree arithmetic unit 37 to be outputted to the throttle valve controller 36.

Figure 18:
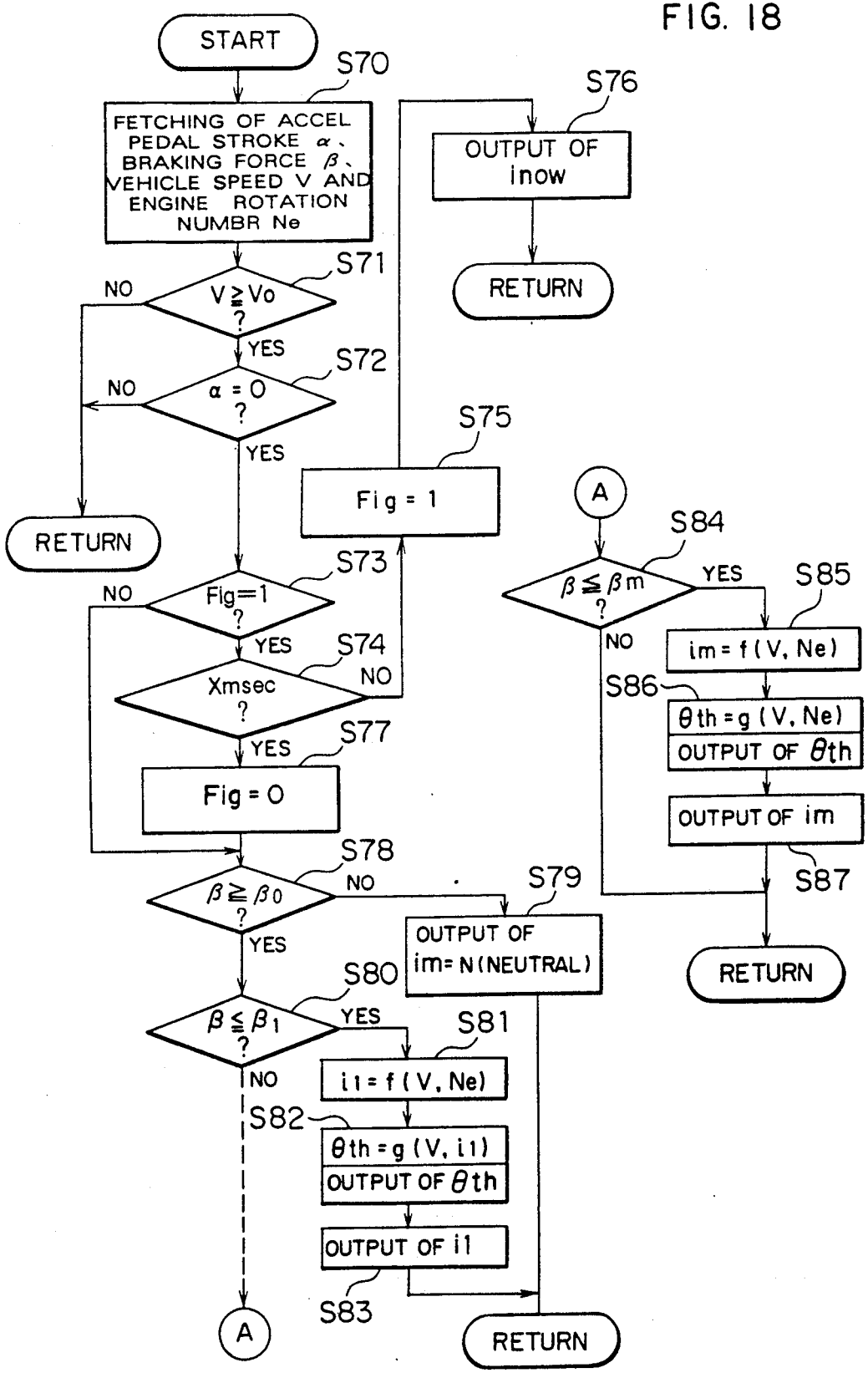
FIG. 18 is a flow chart for illustrating a control procedure performed by the control system shown in FIG. 17.

FIG. 18 shows a flow chart for illustrating the control processing performed by the control system shown in FIG. 17. Referring to FIG. 18, there are first fetched an accelerator pedal stroke $\alpha$, a braking force B, a vehicle speed V and an engine rotation number $N_e$ at a step S70. Subsequently, decision is made at a step S71 as to whether the vehicle speed V is equal to or higher than a predetermined speed $V_0$. When $V \geq V_0$, then it is decided at a step S72 whether the accelerator pedal stroke $\alpha$ is zero. In case the accelerator pedal stroke $\alpha$ is zero, indicating that the accelerator pedal is not pushed down or actuated, a flag "Flg" is set at steps S73 and S75. During a given period of X msec determined at a step S74, the current speed change ratio $i_{now}$ is outputted at a step S76. Subsequently, after lapse of the duration of X msec, as determined at the step S74, the flag "Flg" is cleared at a step S77, whereon the value of the braking force $\beta$ is detected at the step S70. When it is found at a step S78 that the braking force $\beta$ is smaller than a predetermined value $\beta_0$, it is determined that the driver demands the inertia deceleration (inertia brake), whereby the transmission is set to the neutral position ($i_m = N$) at a step S79. Subsequently, when decision is made at a step S80 that the braking force $\beta$ is equal to or smaller than $\beta_1$, the transmission gear ratio $i_1$ is determined in accordance with a function $f(V, N_e)$ of the vehicle speed V and the engine rotation number $N_e$ at a step S81. Next, at a step S82, the throttle opening degree $\theta_{th}$ is determined in accordance with a function $g(V, i_l)$ of the vehicle speed V and the transmission gear ratio $i_l$ to output the throttle opening degree $\theta_{th}$ as determined, being followed by a step S83 for outputting the transmission gear ratio $i_l$. Thereafter, the transmission gear ratio and the throttle opening degree are determined, every time the braking force is changed, through the control procedure described above. In case the braking force $\beta$ is found to be a maximum $\beta_m$ at a step S84, indicating that the driver demands the maximum braking force, then the transmission gear ratio and the throttle opening degree are so determined that the engine rotation number is decreased through the processing steps S85, S86 and S87. The values $\beta_0$ to $\beta_m$ are set to values which are proportional to the transmission gear ratios of the automatic transmission (torque converter) which are capable of being controlled.

Figure 19:
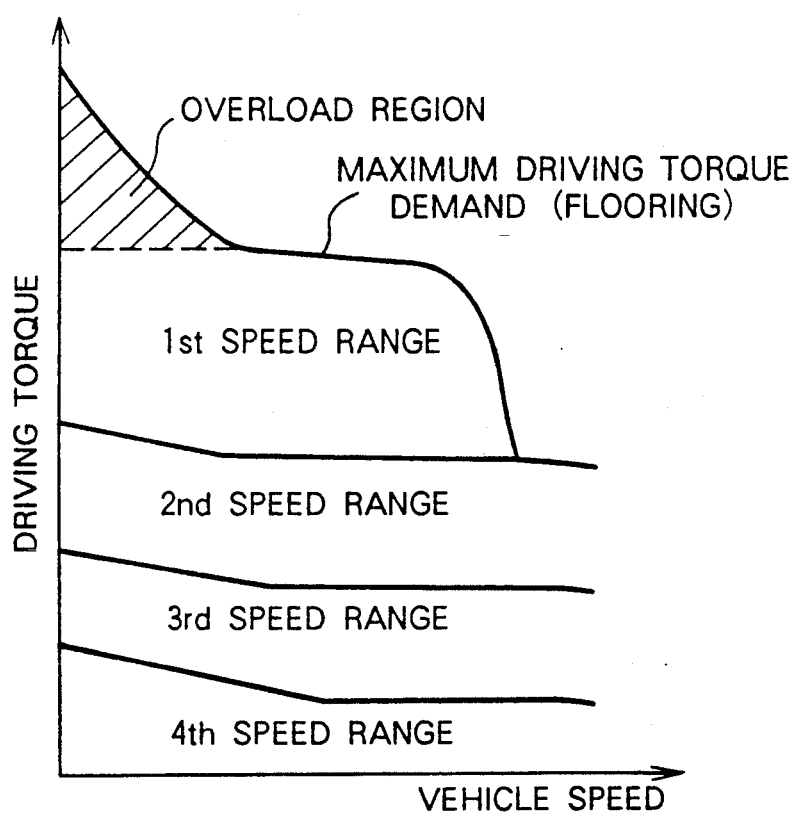
FIG. 19 is a view for graphically illustrating the concept of a further example of the control scheme according to the invention.

FIG. 19 is a view for graphically illustrating the concept of an overload reduction control system to which the present invention can be applied. In a stepwise automatic transmission in which a torque converter is used, there exists an overload area in the low speed state of the first speed range, as indicated by a hatched area. Consequently, it is required to decrease the maximum demand value of the driving torque (the upper limit of the opening degree of the throttle valve) in order to prevent occurrence of impulsive torque at the start of the motor vehicle. By adopting this control scheme, the second, third and fourth speed ranges can be used more frequently at a lower range of the desired driving torque (at small accelerator pedal strokes) while mitigating fatigue which the driving system may experience.

Figure 20:
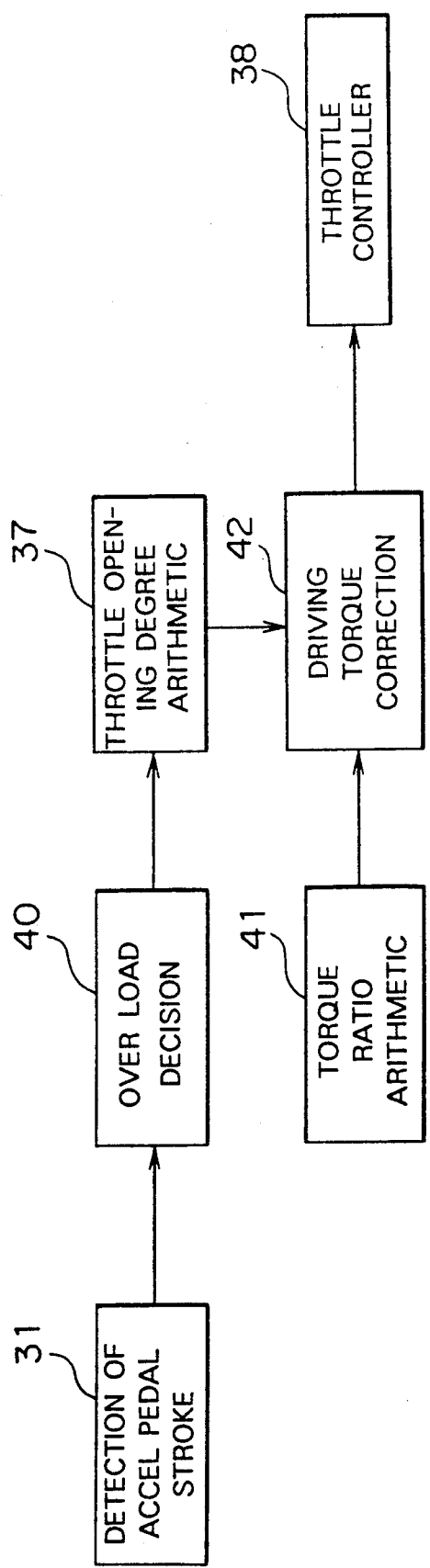
FIG. 20 is a functional block diagram showing a control system according to a still further embodiment of the invention.

FIG. 20 is a functional block diagram showing the overload reduction control system. Referring to the figure, the decelerator pedal stroke is detected by an accelerator pedal stroke detecting part 31, whereon decision is made by an overload decision function block 40 as to whether or not the overload control should be performed. When the overload control is necessary, the throttle opening degree is determined by the throttle opening degree arithmetic function block 37, which is then followed by determination of a corrected throttle opening degree by a driving torque correcting part 42. The corrected throttle opening degree thus determined is outputted to the throttle valve controller. The driving torque correcting part 42 is supplied with a torque ratio of the torque converter which is determined by a torque ratio arithmetic part 41, whereby the torque ratio is corrected correspondingly.

Figure 21:
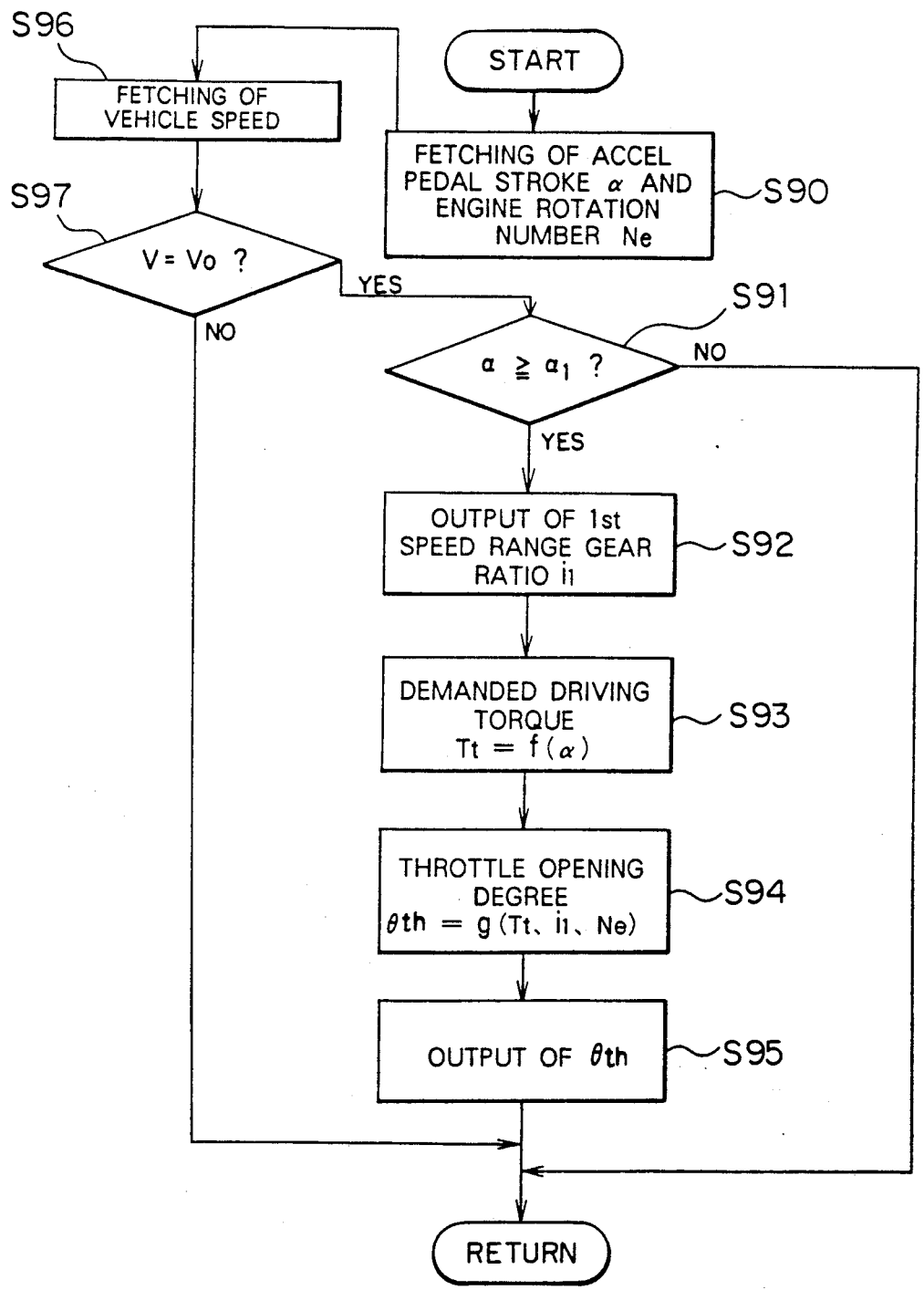
FIG. 21 is a flow chart for illustrating a control procedure executed by the system shown in FIG. 20.

FIG. 21 is a flow chart for illustrating a control procedure based on the concept shown in FIG. 20. Referring to FIG. 21, the accelerator pedal stroke $\alpha$ and the engine rotation number $N_e$ are fetched at a step S90. When it is found at a step S91 that the accelerator pedal stroke $\alpha$ is equal to or greater than $\alpha_1$, i.e. when the vehicle speed is lower than $V_0 (= 30$ km/h, for example) and that the speed change position of the transmission falls within the first speed range, the transmission gear ratio $i_l$ is outputted at a step S92, whereon the desired driving torque value is determined in accordance with the function $f(\alpha)$ of the accelerator pedal stroke $\alpha$ at a step S93. Thereafter, the throttle opening degree $\theta_{th}$ is determined in accordance with a function $g(t_l, i_l, N_e)$ at a step S94. The throttle opening degree $\theta_{th}$ thus determined is outputted at a step S95. At that time, the maximum value of the driving torque is set at a value which corresponds to the maximum value of the accelerator pedal stroke.

Figure 22:
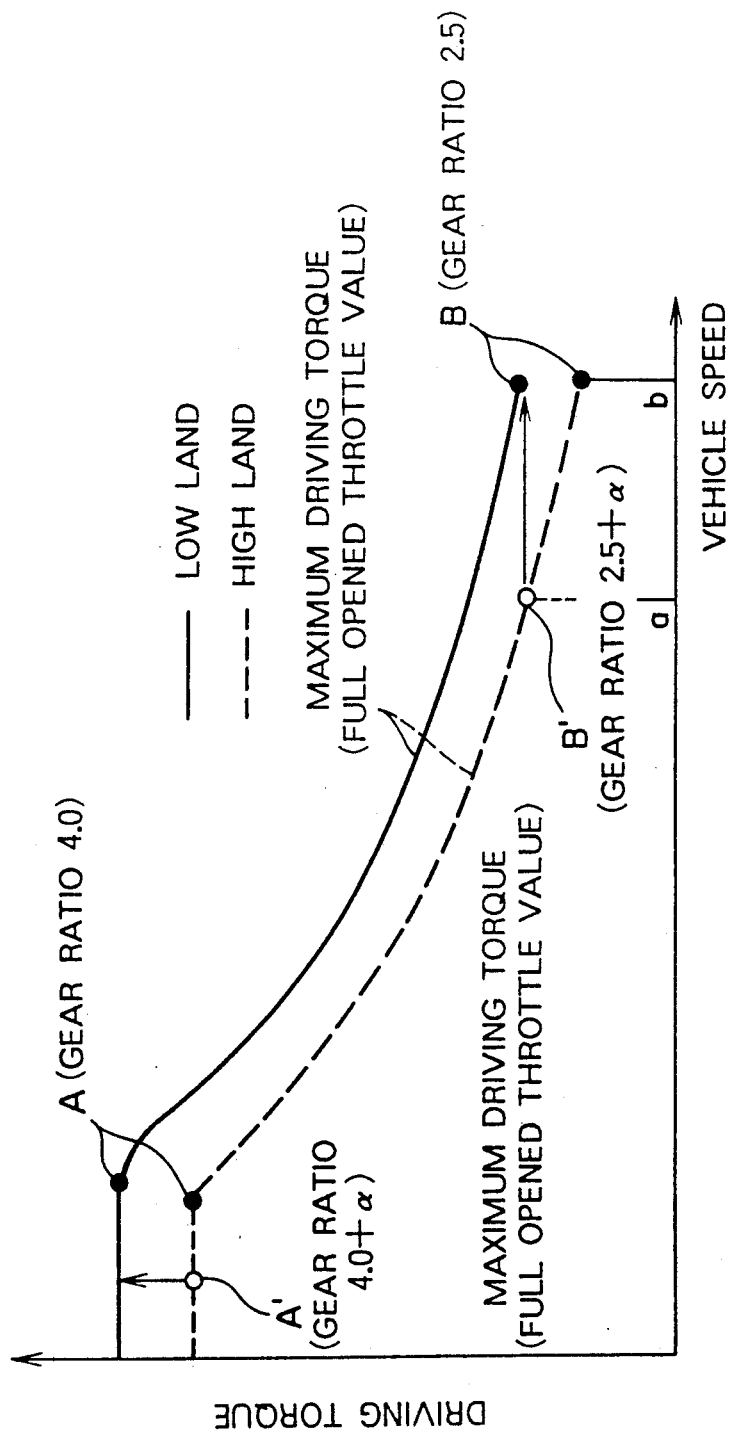
FIG. 22 is a view for graphically illustrating the concept of another control scheme according to the invention.

FIG. 22 is a view for graphically illustrating the concept of a driving torque correcting control system in which change in the atmospheric pressure is taken into account. Because of difference in the atmospheric pressure between a high land and a low land, the maximum driving torque undergoes a corresponding change. Under the circumstances, a transmission gear ratio B' at a vehicle speed a is effectuated at a vehicle speed b when the vehicle is running on a high land or hill. Thus, a substantially same driving torque is obtained even during the running on a low land, whereby the driving torque demanded by the driver can be satisfied notwithstanding of changes in the atmospheric pressure.

Figure 23:
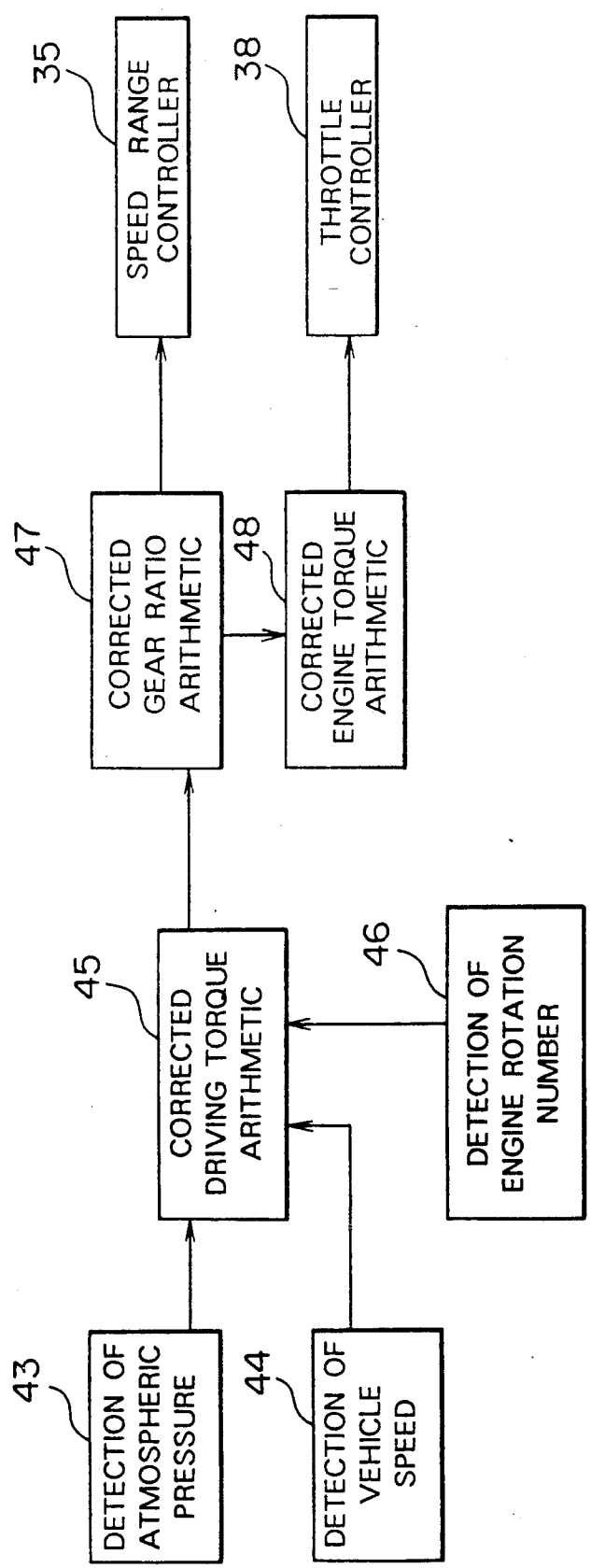
FIG. 23 is a functional block diagram of a control system designed for realizing the control scheme shown in FIG. 22.

FIG. 23 is a functional block diagram of a control system designed for controlling the driving torque while taking into consideration the changes in the atmospheric pressure. The atmospheric pressure is detected by an atmospheric pressure detection block 43 and inputted to a corrected driving torque arithmetic function block 45 which determines a corrected driving torque on the basis of the atmospheric pressure as well as the vehicle speed and the engine rotation number detected by the vehicle speed detector 44 and an engine rotation number detector 46, respectively. Subsequently, a corrected transmission gear ratio is determined by a corrected transmission ratio arithmetic unit 47 while a corrected throttle opening degree is determined by a corrected engine output arithmetic unit 45, whereon the corrected gear ratio and the corrected engine torque are outputted to a speed change controller 35 and a throttle controller 38, respectively.

Figure 24:
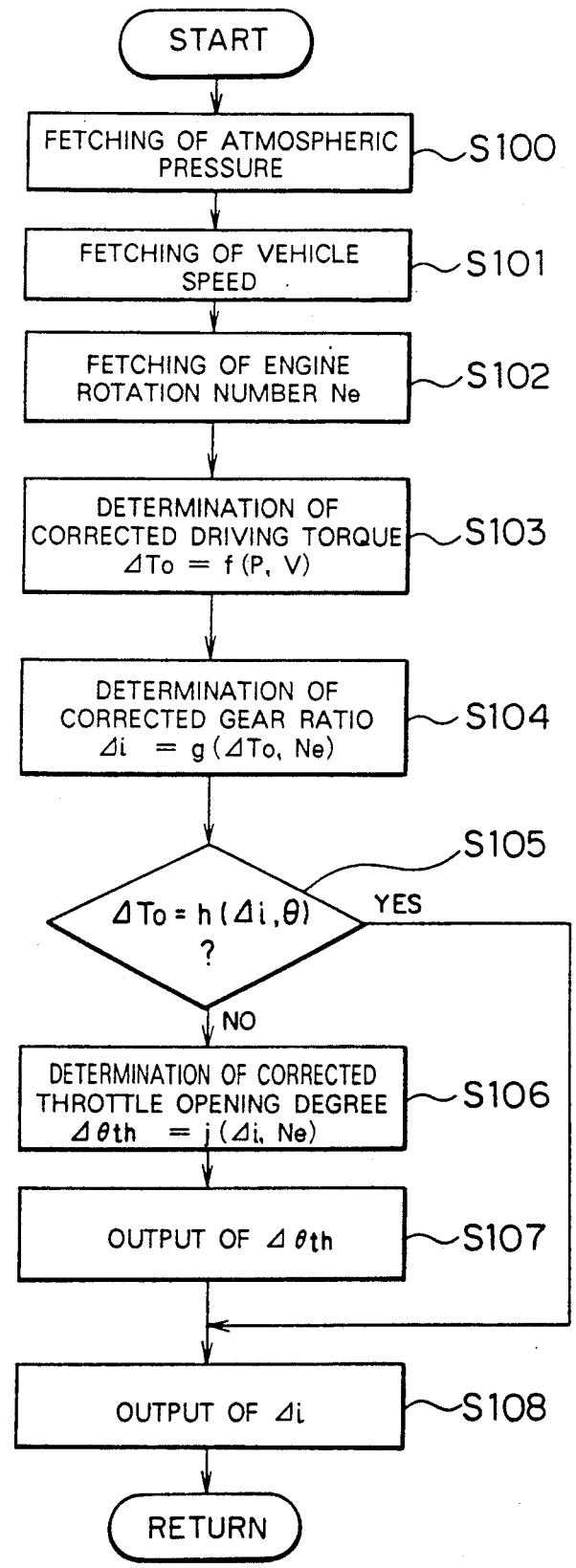
FIG. 24 is a flow chart for illustrating a control operation performed by the system shown in FIG. 23.

FIG. 24 is a flow chart for illustrating the control operation performed by the system shown in FIG. 23. Referring to FIG. 24, the atmospheric pressure P, the vehicle speed V and the engine rotation speed $N_e$ are fetched at steps S100, S101 and S102, respectively. At a step S103, the corrected driving torque $T_0$ is determined in accordance with a function $f(P, V)$, while the corrected transmission ratio $\Delta_i$ is determined in accordance with a function g(T$_0$, N$_c$) At a step S105, it is decided whether h($\Delta_i$, $\theta$) determined on the basis of the corrected transmission ratio $\Delta_i$ and the throttle opening degree $\theta_{th}$ coincides with $\Delta T_0$. When coincidence is found, the transmission ratio $\Delta T_i$ is outputted straightforwardly because correction of the throttle opening degree is unnecessary. On the other hand, when discrepancy is found at a step S105, the corrected throttle opening degree $\theta_{th}$ is determined in accordance with a function j($\Delta_i$, N$_e$) at a step S106, whereon the transmission ratio $\Delta_i$ at that time is outputted at a step S108.

Figure 25:
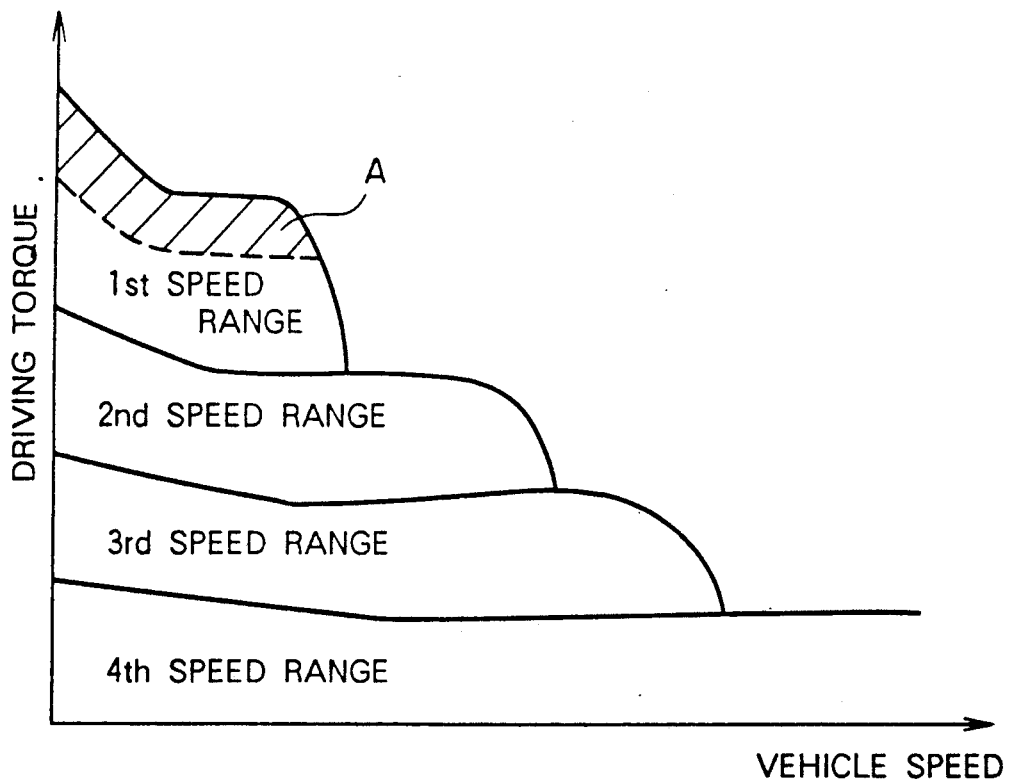
FIG. 25 is a view showing graphically still another control scheme according to the invention.

FIG. 25 is a view showing graphically the concept of an air-fuel ratio control according to another modified embodiment of the invention. As can be seen in the figure, the air-fuel ratio (A/F) is decreased only within a power zone indicated by a hatched area to thereby enrich the air fuel mixture. In the other region, the air-fuel ratio is increased to make the air-fuel mixture lean.

Figure 26:
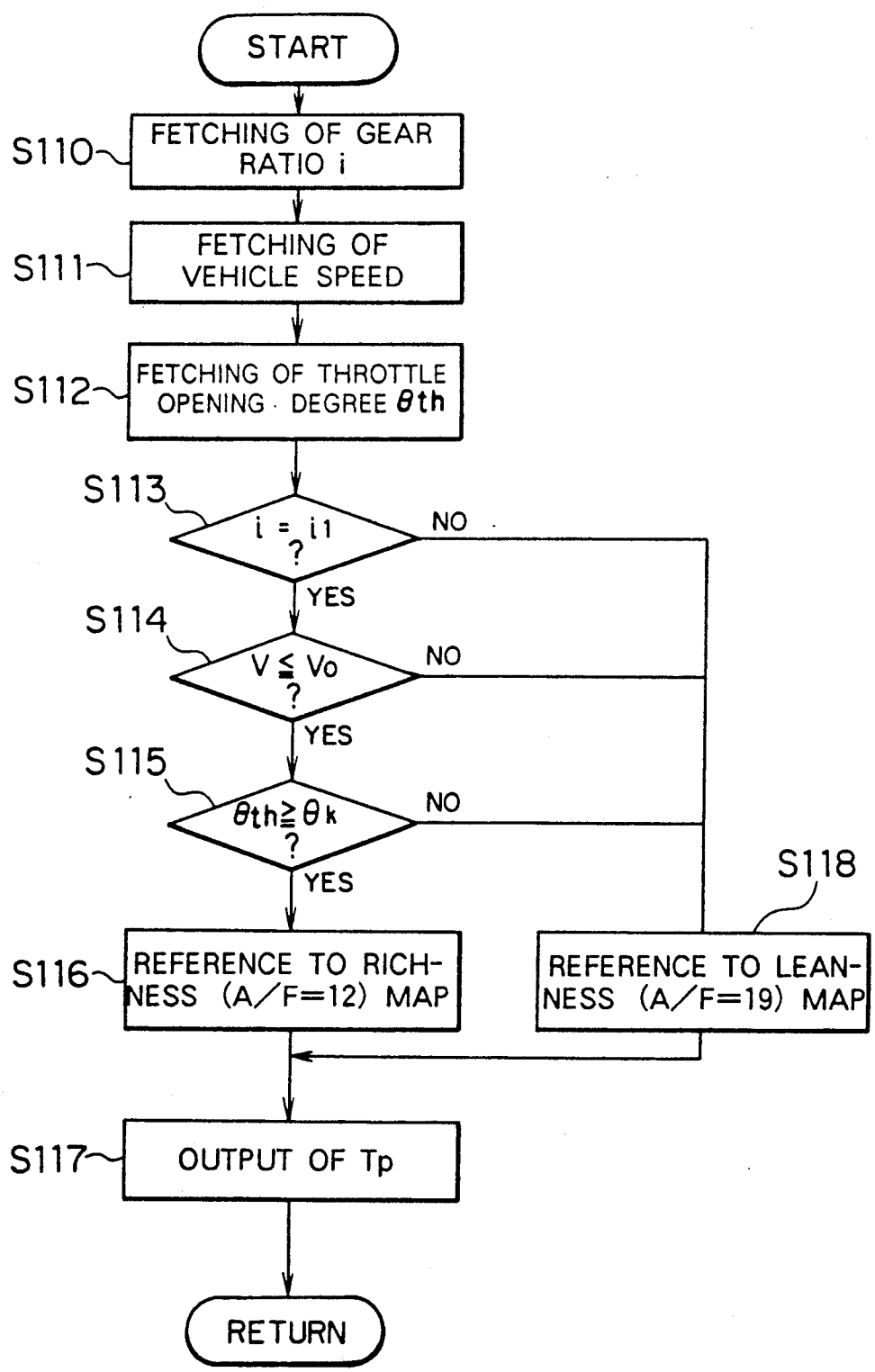
FIG. 26 s a flow chart for illustrating the control procedure for executing the control scheme shown in FIG. 25.

FIG. 26 is a flow chart for illustrating the air-fuel control processing. Referring to the figure, the transmission gear ratio i, the vehicle speed V and the throttle opening degree $\theta_{th}$ are fetched at steps S110, S111 and S112, respectively. At a step S113, decision is made as to whether the vehicle speed i falls within the first speed range i$_l$. At a speed S114, it is decided whether the vehicle speed V is equal to or smaller than a predetermined speed V$_0$ (e.g. 60 km/h). At a step S115, it is decided whether the throttle opening degree $\theta_{th}$ is equal to or greater than a predetermined value $\theta_k$. Provided that i=i$_l$, V$\leq$V$_0$ and that $\theta_{th}\geq\theta_k$, richness (A/F=12) is determined from an air-fuel ratio map at a step S116, whereon a corresponding fuel amount signal T$_p$ is outputted at a step S117. Otherwise, leanness (A/F=19) is determined from the air-fuel ratio map at a step S118, whereon a corresponding amount signal T$_p$ is outputted at a step S117.

According to the teachings of the present invention described above, there can be realized a fit of sufficient degree between the maneuverability demanded by the driver and the actual maneuvering of the vehicle which follows the demand.

We claim:

1. An apparatus for controlling driving power of a vehicle having an engine, a transmission, means for detecting vehicle speed and means for detecting the stroke of an accelerator pedal, comprising:
   first means for obtaining a desired driving torque of a vehicle required by a driver on the basis of a detected value of vehicle speed and a detected value of accelerator pedal stroke; and
   second means responsive to said first means for controlling the transmission gear ratio of said transmission and engine torque so as to drive an engine substantially in a smallest fuel-cost ratio region on the basis of the obtained desired driving torque.

2. An apparatus according to claim 1, wherein said first means includes a map defining desired driving torques for various vehicle speeds and accelerator pedal strokes, and means for retrieving a value of driving torque from said map on the basis of a detected value of vehicle speed and a detected value of accelerator pedal stroke to obtain a desired driving torque.

3. An apparatus according to claim 1, wherein said second means includes a map defining transmission gear ratios of the transmission for various vehicle speeds and desired driving torques, means for retrieving a value of transmission gear ratio from said map on the basis of a detected value of the vehicle speed and the obtained desired driving torque to obtain a transmission gear ratio, and means for determining an engine torque to be controlled on the basis of the obtained transmission gear ratio and desired driving torque.

4. An apparatus according to claim 1, wherein said second means includes a first map defining transmission gear ratios of the transmission for various vehicle speeds and desired driving torques, a second map for defining relations among engine rotation speeds, engine torques and fuel-cost ratios, means for retrieving a value of transmission gear ratio from said first map on the basis of a detected value of the vehicle speed and the obtained desired driving torque to obtain a transmission gear ratio with reference to said second map, and means for determining an engine torque to be controlled on the basis of the obtained transmission gear ratio and desired driving torque.

5. An apparatus according to claim 1, further comprising means for controlling a flow rate of air sucked into the engine in the case of changing the transmission gear ratio so as to maintain the desired driving torque.

6. An apparatus according to claim 1, wherein said second means controls the transmission gear ratio and the engine torque so as to provide a high engine torque or a low engine negative pressure.

7. An apparatus according to claim 1, further comprising selecting means, responsive to an accelerator pedal stroke of zero, for selecting a transmission gear ratio in accordance with a brake pedal stroke.

8. An apparatus according to claim 7, wherein said selecting means includes means for controlling the engine speed so as to maintain the vehicle speed when the transmission gear ratio is changed.

9. An apparatus according to claim 7, wherein said selecting means includes means for setting the transmission to a neutral position when both the acceleration pedal stroke and the brake pedal stroke are zero.

10. An apparatus according to claim 1, wherein the transmission is an automatic transmission.

11. An apparatus according to claim 1, wherein the transmission is a stepless automatic transmission.

12. An apparatus according to claim 1, wherein the transmission is a stepwise automatic transmission.

13. An apparatus according to claim 1, further comprising means for controlling a transmission gear ratio so as to maintain the desired driving torque when an air-fuel-ratio of a mixture in the engine is changed.

14. An apparatus according to claim 13, wherein said means for controlling a transmission gear ratio includes means for lowering a transmission gear ratio when an air-fuel-ratio of the mixture falls into a lean state.

15. A method for controlling the driving power of a vehicle having a transmission coupled to an engine, comprising the steps of:
   obtaining a desired driving torque of a vehicle required by a driver on the basis of a detected value of vehicle speed and a detected value of accelerator pedal stroke; and
   controlling a transmission gear ratio of the transmission and engine torque so as to drive the engine substantially within a smallest fuel-cost ratio region on the basis of the obtained desired driving torque.

16. A method according to claim 15, wherein said step of obtaining includes a step of providing a map defining desired driving torques for various vehicle speeds and accelerator pedal strokes, and a step for retrieving a value of driving torque from said map on the basis of a detected value of the vehicle speed and a detected value of the accelerator pedal stroke to obtain the desired driving torque.

17. A method according to claim 15, wherein said step of controlling includes a step of providing a map defining transmission gear ratios of the transmission for various vehicle speeds and desired driving torques, a step of retrieving a value of transmission gear ratio from said map on the basis of a detected value of the vehicle speed and the obtained desired driving torque to obtain a transmission gear ratio, and a step of determining an engine torque to be controlled on the basis of the obtained transmission gear ratio and desired driving torque.

18. A method according to claim 15, wherein said step of controlling includes a step of providing a first map defining transmission gear ratios of the transmission for various vehicle speeds and desired driving torques, a step of providing a second map for defining relations among engine rotation speeds, engine torques and fuel-cost ratios, a step of retrieving a value of driving torque from said first map on the basis of a detected value of the vehicle speed and the obtained desired driving torque to obtain a transmission gear ratio with reference to said second map, and a step of determining an engine torque to be controlled on the basis of the obtained transmission gear ratio and desired driving torque.

19. A method according to claim 15, further comprising a step of controlling a flow rate of air sucked into the engine in the case of changing the transmission gear ratio so as to maintain the desired driving torque.

20. A method according to claim 15, wherein said step of controlling controls the transmission gear ratio and the engine torque so as to provide a high engine torque or a low engine negative pressure.

21. A method according to claim 15, further comprising, when the accelerator pedal stroke is zero, a step of selecting a transmission gear ratio in accordance with a brake pedal stroke.

22. A method according to claim 21, wherein said step of selecting includes a step of controlling the engine speed so as to maintain the vehicle speed when the transmission gear ratio is changed.

23. A method according to claim 21, wherein said step of selecting includes a step of setting the transmission to a neutral position when both the acceleration pedal stroke and the brake pedal stroke are zero.

24. A method according to claim 15, wherein the transmission is an automatic transmission.

25. A method according to claim 15, wherein the transmission is a stepless automatic transmission.

26. A method according to claim 15, wherein the transmission is a stepwise automatic transmission.

27. A method according to claim 15, further comprising a step of controlling the transmission gear ratio of the transmission so as to maintain a desired driving torque when an air-fuel-ratio of a mixture in the engine is changed.

28. A method according to claim 15, wherein said step of controlling the transmission gear ratio includes a step of lowering the transmission gear ratio when an air-fuel-ratio of the mixture falls within a lean state.

29. An apparatus for controlling driving power of a vehicle having an engine and a transmission, comprising:
   means for detecting vehicle speed and the stroke of an accelerator pedal; and
   means for controlling the transmission gear ratio of said transmission and engine torque so as to drive an engine substantially in a smallest fuel-cost ratio region on the basis of a detected value of vehicle seed and a detected value of accelerator pedal stroke.

30. An apparatus according to claim 29, wherein said means for controlling includes a first map defining transmission gear ratios of the transmission for various vehicle speeds and values of accelerator pedal, means for retrieving a value of transmission gear ratio from said first map on the basis of a detected value of the vehicle speed and a detected value of the accelerator pedal to obtain a transmission gear ratio, and means for determining an engine torque to be controlled on the basis of the obtained transmission gear ratio and the detected value of the accelerator pedal.

31. An apparatus according to claim 29, wherein said means for controlling includes a first map defining transmission gear ratios of the transmission for various vehicle speeds and values of accelerator pedal, a second map for defining relations among engine rotation speeds, engine torques and fuel-cost ratios, means for retrieving a value of transmission gear ratio from said first map on the basis of a detected value of the vehicle speed and a detected value of the accelerator pedal to obtain a transmission gear ratio with reference to said second map, and means for determining an engine torque to be controlled on the basis of the obtained transmission gear ratio and the detected value of the accelerator pedal.

32. A method for controlling the driving power of a vehicle having a transmission coupled to an engine, comprising:
   means for obtaining a desired driving torque of a vehicle required by a driver on the basis of a detected value of vehicle speed and a detected value of accelerator pedal stroke; and
   means for controlling a transmission gear ratio of the transmission and engine torque so as to drive the engine substantially within a smallest fuel-cost ratio region on the basis of the obtained desired driving torque.

33. A method according to claim 32, wherein said means for obtaining includes means for providing a map defining desired driving torques for various vehicle speeds and accelerator pedal strokes, and means for retrieving a value of driving torque from said map on the basis of a detected value of the vehicle speed and a detected value of the accelerator pedal stroke to obtain the desired driving torque.

34. A method according to claim 32, wherein said means for controlling includes means for providing a map defining transmission gear ratios of the transmission for various vehicle speeds and desired driving torques, means for retrieving a value of transmission gear ratio from said map on the basis of a detected value of the vehicle speed and the obtained desired driving torque to obtain a transmission gear ratio, and means for determining an engine torque to be controlled on the basis of the obtained transmission gear ratio and desired driving torque.

35. A method according to claim 32, wherein said means for controlling includes means for providing a first map defining transmission gear ratios of the transmission for various vehicle speeds and desired driving torques, means for providing a second map for defining relations among engine rotation speeds, engine torques and fuel-cost ratios, means for retrieving a value of driving torque from said first map on the basis of a detected value of the vehicle speed and the obtained desired driving torque to obtain a transmission gear ratio with reference to said second map, and a step of determining an engine torque to be controlled on the basis of the obtained transmission gear ratio and desired driving torque.

* * * * *